US012799893B2

(12) United States Patent
Jang

(10) Patent No.: US 12,799,893 B2
(45) Date of Patent: Nov. 17, 2026

(54) VARIABLE COMPRESSION RATIO ENGINE

(71) Applicant: Soon Gil Jang, Seoul (KR)

(72) Inventor: Soon Gil Jang, Seoul (KR)

( * ) Notice: Subject to any disclaimer, the term of this patent is extended or adjusted under 35 U.S.C. 154(b) by 0 days.

(21) Appl. No.: 19/286,273

(22) Filed: Jul. 31, 2025

(65) Prior Publication Data

US 2025/0389221 A1 Dec. 25, 2025

Related U.S. Application Data

(63) Continuation of application No. PCT/KR2025/005594, filed on Apr. 25, 2025.

(30) Foreign Application Priority Data

Jun. 20, 2024 (KR) ........................ 10-2024-0080076
Jul. 2, 2024 (KR) ........................ 10-2024-0086603
Nov. 11, 2024 (KR) ........................ 10-2024-0158940
Apr. 23, 2025 (KR) ........................ 10-2025-0052877

(51) Int. Cl.
*F02B 75/04* (2006.01)

(52) U.S. Cl.
CPC .................................. *F02B 75/047* (2013.01)

(58) Field of Classification Search
CPC ...... F02D 15/02; F02D 15/00; F02D 2700/03; F02B 75/04; F02B 75/047; F02B 75/048; F16H 21/18; F16H 21/20; F16H 21/30; F16H 21/22
See application file for complete search history.

(56) References Cited

U.S. PATENT DOCUMENTS

| | | | | | |
|---|---|---|---|---|---|
| 3,861,239 | A * | 1/1975 | McWhorter | F02B 41/04 | 123/48 B |
| 4,152,955 | A * | 5/1979 | McWhorter | F01B 9/02 | 123/48 B |
| 9,726,078 | B2 * | 8/2017 | Shen | F02B 75/048 | |
| 2017/0211471 | A1 | 7/2017 | de Gooijer et al. | | |
| 2021/0340905 | A1 * | 11/2021 | Gutzer | F02D 15/02 | |

FOREIGN PATENT DOCUMENTS

| | | | | |
|---|---|---|---|---|
| CN | 203879624 | U * | 10/2014 | |
| DE | 102017207644 | A1 * | 11/2018 | F02D 41/005 |
| JP | 2009-138619 | A | 6/2009 | |
| JP | 2017-218919 | A | 12/2017 | |
| JP | 2017-227138 | A | 12/2017 | |
| WO | WO-2009101173 | A1 * | 8/2009 | F02B 41/04 |
| WO | WO-2013160501 | A1 * | 10/2013 | F16C 3/28 |

* cited by examiner

*Primary Examiner* — George C Jin
*Assistant Examiner* — Teuta B Holbrook
(74) *Attorney, Agent, or Firm* — NKL LAW; Jae Youn Kim

(57) ABSTRACT

In a variable compression ratio engine according to the present invention, an eccentric sleeve is installed on a crankpin, and an effective length of a connecting rod is changed by adjusting a posture of an eccentric sleeve relative to the connecting rod, or an effective length of a crank arm is changed by adjusting a posture of an eccentric sleeve relative to the crank arm. An eccentric sleeve control shaft installed on a main journal or one shaft of a planetary gear system is connected to an eccentric sleeve by means of an eccentric sleeve auxiliary shaft. Automatic adjustment of the compression ratio based on crankshaft rotation speed may be achieved using a rotor, a stator, or a rack.

18 Claims, 38 Drawing Sheets

VARIABLE COMPRESSION RATIO ENGINE

TECHNICAL FIELD

The present invention relates to a variable compression ratio engine, and more particularly, to an internal combustion engine capable of easily adjusting and changing a compression ratio of the internal combustion engine, as necessary.

BACKGROUND ART

Internal combustion engines are often used in environments in which optimal compression ratios are changed over time without being constant in vehicles. However, the compression ratio of the internal combustion engine in the related art is not easy to change and is inevitably used in a state in which the compression ratio is set at a time point at which the internal combustion engine is designed and manufactured approximately first.

Various methods capable of changing the compression ratios of the internal combustion engines as necessary have been disclosed and implemented. Among the methods, as methods of changing volumes of combustion chambers when pistons are positioned at top dead centers, there have been a method of changing a space of a cylinder head and a method of changing the top dead center of the piston. As the method of changing the top dead center of the piston, there have been a method of changing a distance between a crankshaft and a head, a method of changing a length of a crank arm, a method of changing a length of a connecting rod, a method of using multiple links, and the like.

As the method of changing the length of the connecting rod, there has also been a method of changing an effective length of the connecting rod by using an eccentric sleeve, in which a center of an outer circumference and a center of an inner circumference are not consistent with each other, on a crankpin.

As the method of using the eccentric sleeve, there have been a method of rotating the eccentric sleeve by using a hydraulic device and a method of rotating the eccentric sleeve by using a mechanical device including a rod, a rack, a gear, and the like connected to the eccentric sleeve. However, the hydraulic device has difficulty in accurately controlling angles of pipes and the eccentric sleeve. The mechanical device including the rod, the rack, the gear, and the like connected to the eccentric sleeve cause various problems of strong impact, vibration, and noise, which occur during a fast reciprocating motion and an explosion stroke, and increases in weight and space.

SUMMARY OF THE INVENTION

Technical Problem

An object to be achieved by the present invention is to provide an apparatus capable of easily changing a compression ratio, as necessary. Another object to be achieved by the present invention is to provide a practical method of easily adjusting a posture of an eccentric sleeve as a method of using the eccentric sleeve.

Technical Solution

A compression ratio may be changed by adjusting an effective length of a connecting rod by manipulating a posture of an eccentric sleeve 13 installed on a crankpin 2, or the compression ratio may be changed by adjusting an effective length of a crank arm.

In order to adjust the effective length of the connecting rod, the posture of the eccentric sleeve 13 relative to a piston pin needs to be manipulated with no rotation regardless of the rotation of a main journal 1.

This configuration may be implemented by maintaining the eccentric sleeve 13 in the same posture as an eccentric sleeve control shaft 10 installed on the main journal 1. This is because when the posture of the eccentric sleeve control shaft 10 is manipulated, the posture of the eccentric sleeve 13 is also manipulated.

According to the method, an eccentric sleeve auxiliary shaft 25 is installed on an eccentric sleeve auxiliary shaft support bracket 5 provided on a crank arm 3, an eccentric sleeve auxiliary gear 22 and an eccentric sleeve control auxiliary gear 21 are respectively installed at two opposite ends of the eccentric sleeve auxiliary shaft 25, and the eccentric sleeve auxiliary gear 22 and the eccentric sleeve control auxiliary gear 21 respective engage with the eccentric sleeve gear 12 connected to the eccentric sleeve 13 and the eccentric sleeve control gear 11 connected to the eccentric sleeve control shaft 10.

In order to adjust the effective length of the crank arm, the eccentric sleeve 13 needs to rotate together with the main journal 1, and the posture of the eccentric sleeve 13 relative to the main journal 1 needs to be manipulated.

This configuration may be implemented by a method of rotating the eccentric sleeve 13 together with the main journal 1 by means of one shaft of the planetary gear system installed on the main journal 1 and advancing or retracting the eccentric sleeve 13 by means of another shaft of the planetary gear system.

According to the method, an eccentric sleeve auxiliary shaft 25 is installed on an eccentric sleeve auxiliary shaft support bracket 5 provided on a crank arm 3, an eccentric sleeve auxiliary gear 22 and an eccentric sleeve control auxiliary gear 21 are respectively installed at two opposite ends of the eccentric sleeve auxiliary shaft 25, the eccentric sleeve auxiliary gear 22 engages with the eccentric sleeve gear 12 connected to the eccentric sleeve 13, and the eccentric sleeve control auxiliary gear 21 engages with the sun gear 51, the ring gear 54, the external ring gear 54*o*, or the carrier gear 58 of the planetary gear system.

Effects of the Invention

It is possible to independently and simply change the compression ratio of each of the cylinders by using one of the methods of manipulating the posture of the eccentric sleeve according to the present invention. The method of adjusting the effective length of the connecting rod moves the top dead center and the bottom dead center in the same direction, changes the compression ratio, and does not change the stroke and the amount of exhaust gas. The method of adjusting the effective length of the crank arm moves the top dead center and the bottom dead center in the opposite directions and changes the compression ratio, the stroke, and the amount of exhaust gas. The simple structure of the variable compression ratio engine according to the present invention may allow the variable compression ratio engine to be widely used with low costs. The variable compression ratio engine may improve the efficiency and performance and reduce the fuel consumption and the emission of pollutants.

BRIEF DESCRIPTION OF THE DRAWINGS

FIG. 4 illustrates a state in which an eccentric sleeve control timing pulley 31 and an eccentric sleeve control auxiliary timing pulley 41 are connected to each other by using a first timing belt 33, an eccentric sleeve timing pulley 32 and an eccentric sleeve auxiliary timing pulley 42 are connected to each other by using a second timing belt 34, an eccentric sleeve control sprocket 36 and an eccentric sleeve control auxiliary sprocket 46 are connected to each other by using a first timing chain 38, and an eccentric sleeve sprocket 37 and an eccentric sleeve auxiliary sprocket 47 are connected to each other by using a second timing chain 39.

In FIGS. 6 to 31, the eccentric sleeve auxiliary shaft 25 installed on the eccentric sleeve auxiliary shaft support bracket 5 so as to idle, a planetary gear shaft 52 is connected to a carrier 55, and a second planetary gear shaft 62 is connected to a second carrier 65. In FIGS. 17 and 18, an auxiliary planetary gear shaft 52*a* is connected to the carrier 55, a sun gear 51 engages with a planetary gear 53, the planetary gear 53 engages with an auxiliary planetary gear 53*a*, and the auxiliary planetary gear 53*a* engages with a ring gear 54.

In FIGS. 6 to 24, the eccentric sleeve auxiliary gear 22 and the eccentric sleeve control auxiliary gear 21 are installed at two opposite ends of the eccentric sleeve auxiliary shaft 25 so as not to idle.

In FIGS. 6, 7, 9 to 24, 27, and 28, the eccentric sleeve 13 is connected to the eccentric sleeve gear 12 and installed on the crankpin 2 so as to idle, and the eccentric sleeve gear 12 engages with the eccentric sleeve auxiliary gear 22.

In FIGS. 25 and 26, the eccentric sleeve 13 is connected to the eccentric sleeve timing pulley 32 or the eccentric sleeve sprocket 37 and installed on the crankpin 2 so as to idle, the eccentric sleeve auxiliary timing pulley 42 or the eccentric sleeve auxiliary sprocket 47 is installed at one end of the eccentric sleeve auxiliary shaft 25 so as not to idle, the eccentric sleeve control auxiliary gear 21 is installed at the other end so as not to idle, and the eccentric sleeve timing pulley 32 and the eccentric sleeve auxiliary timing pulley 42 may be connected by the second timing belt 34, or the eccentric sleeve sprocket 37 and the eccentric sleeve auxiliary sprocket 47 are connected by the second timing chain 39.

In FIGS. 27 and 28, the eccentric sleeve auxiliary gear 22 is installed at one end of the eccentric sleeve auxiliary shaft 25 so as not to idle, and the eccentric sleeve control auxiliary timing pulley 41 or the eccentric sleeve control auxiliary sprocket 46 is installed at the other end so as not to idle.

In FIGS. 6 and 7, the sun gear 51 is installed on the main journal 1 so as to idle, the carrier 55 is integrated with the second carrier 65 and configured to idle relative to the main journal 1, and the eccentric sleeve control auxiliary gear 21 engages with the sun gear 51.

A second sun gear 61 is installed on the main journal 1 so as not to idle, and a second ring gear 64 is fixed to the engine block by means of a fixing rod 67.

Figure 1:
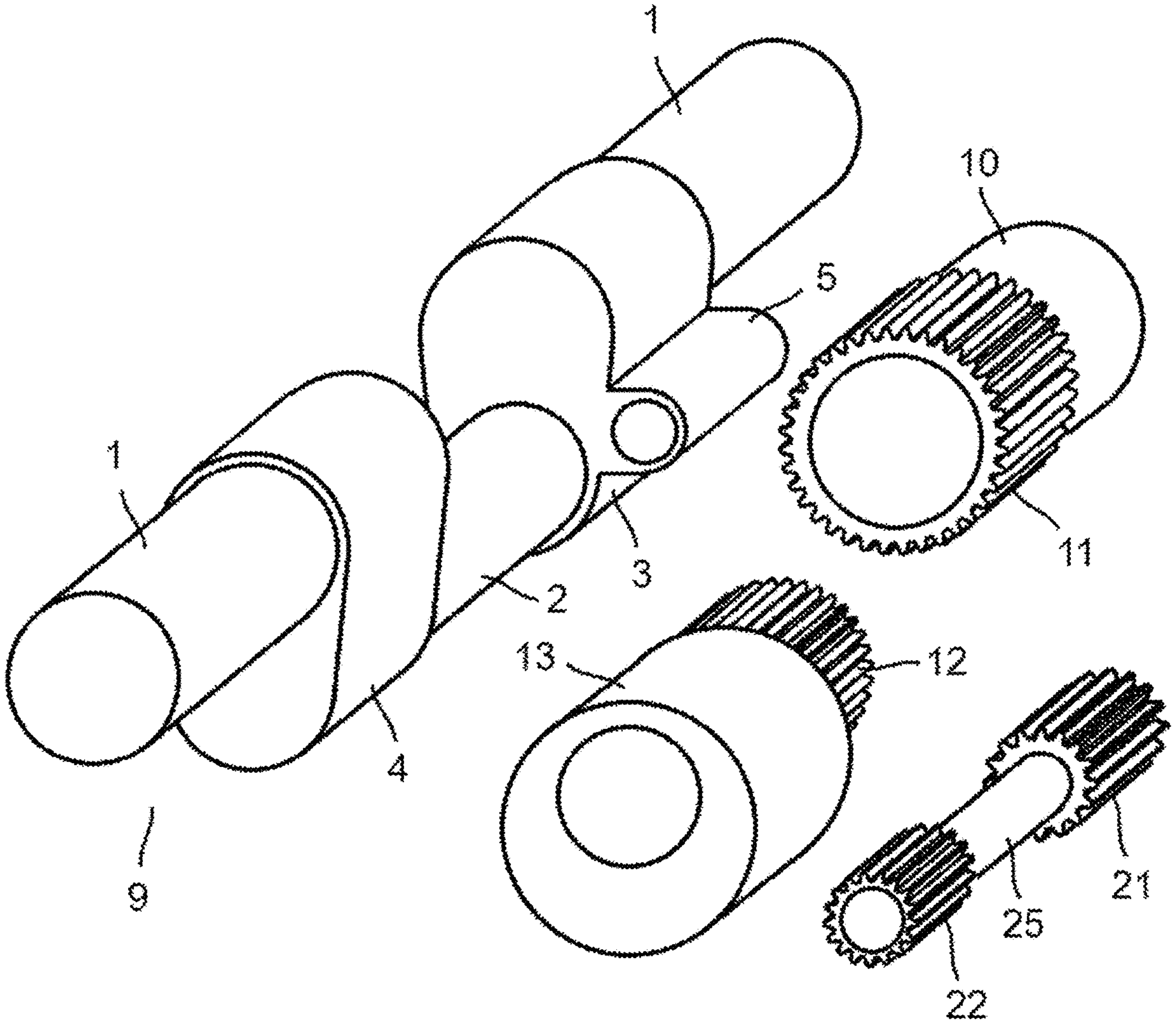
FIG. 1 illustrates a crankshaft 9 having main journals 1, a crankpin 2, crank arms 3 and 4, and an eccentric sleeve auxiliary shaft support bracket 5, an eccentric sleeve control gear 11 connected to an eccentric sleeve control shaft 10, an eccentric sleeve 13 connected to an eccentric sleeve gear 12, and an eccentric sleeve auxiliary shaft 25 on which an eccentric sleeve control auxiliary gear 21 and an eccentric sleeve auxiliary gear 22 are respectively installed at two opposite ends so as not to idle.
Figure 2:
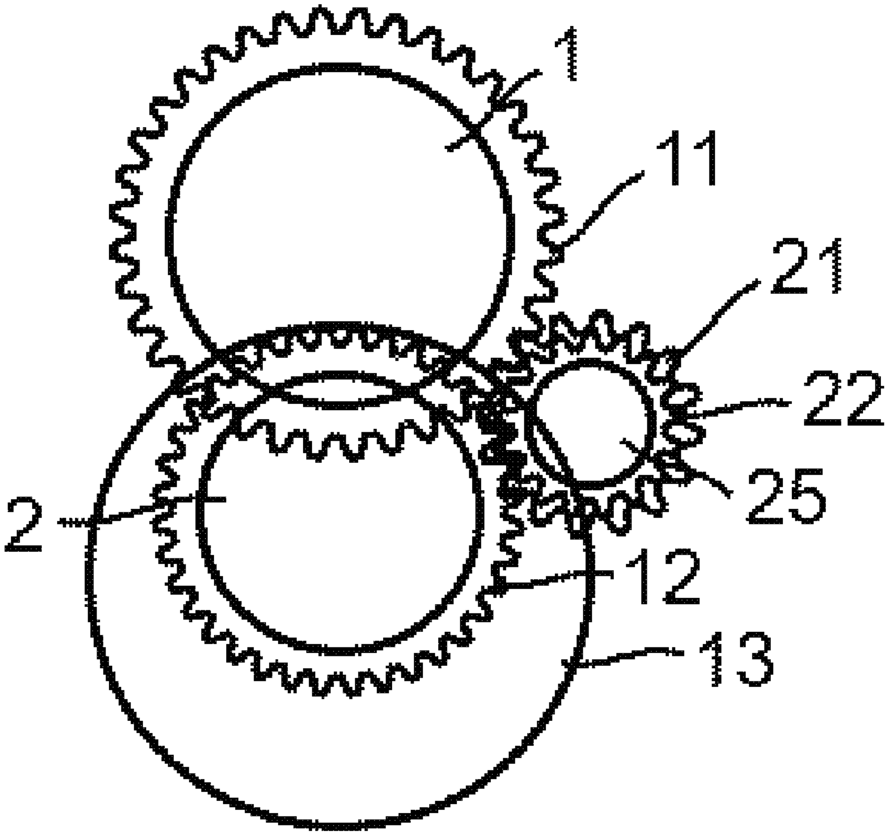
FIG. 2 illustrates a connection relationship between the eccentric sleeve control gear 11 and the eccentric sleeve control auxiliary gear 21 and a connection relationship between the eccentric sleeve gear 12 and the eccentric sleeve auxiliary gear 22.
Figure 3:
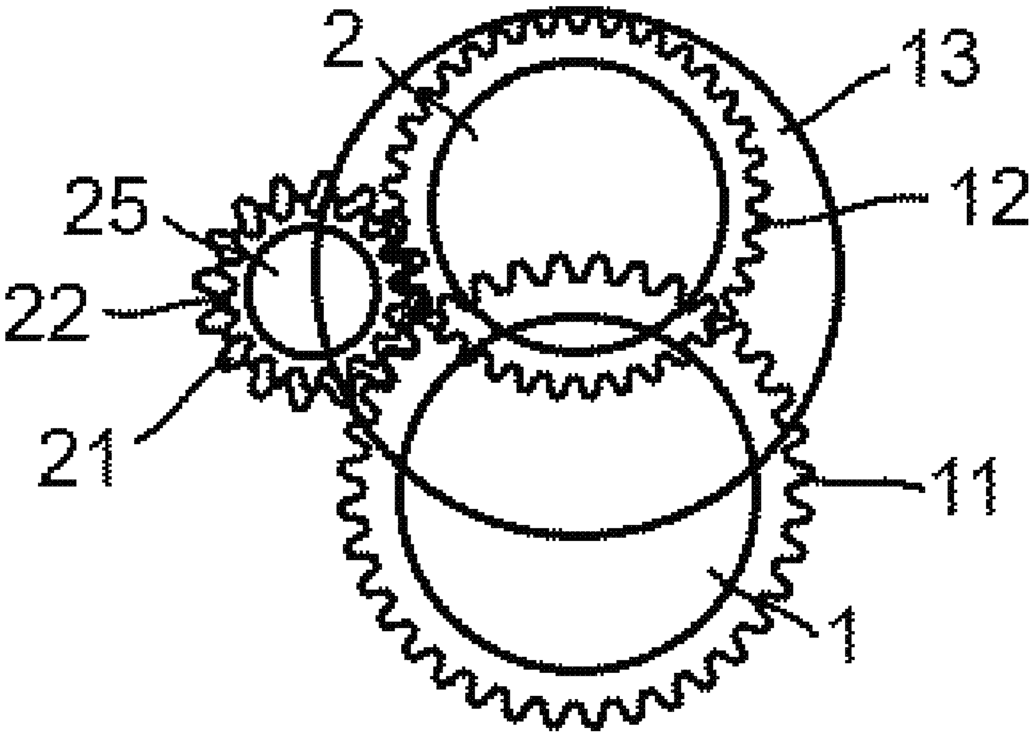
FIG. 3 illustrates a state in which the eccentric sleeve control auxiliary gear 21 in FIG. 2 is revolved around the eccentric sleeve control gear 11 by half a turn.
Figure 6:
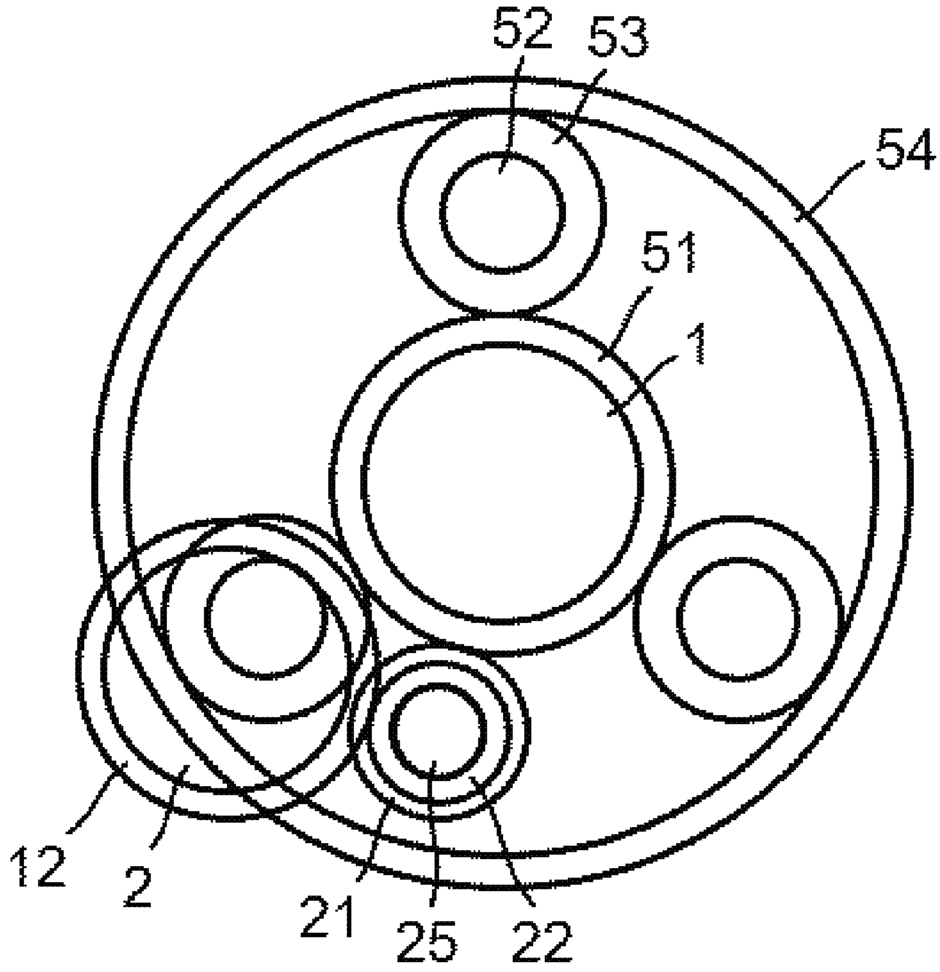
FIGS. 6, 7, and 9 to 28 illustrate that two planetary gear systems are used and substituted for the eccentric sleeve control shaft 10 and the eccentric sleeve control gear 11 in the apparatus illustrated in FIGS. 1 to 3. The main journal 1 and the crankpin 2 are only partially illustrated, the eccentric sleeve 13 connected to the eccentric sleeve gear 12 is not illustrated, and teeth of the gears are not illustrated. A section indicated by reference numeral 59 indicates a zone in which a crank arm 3 and a counterweight are provided, and a section indicated by reference numeral 69 indicates a zone in which an engine block on which the main journal 1 is installed is provided.
Figure 7:
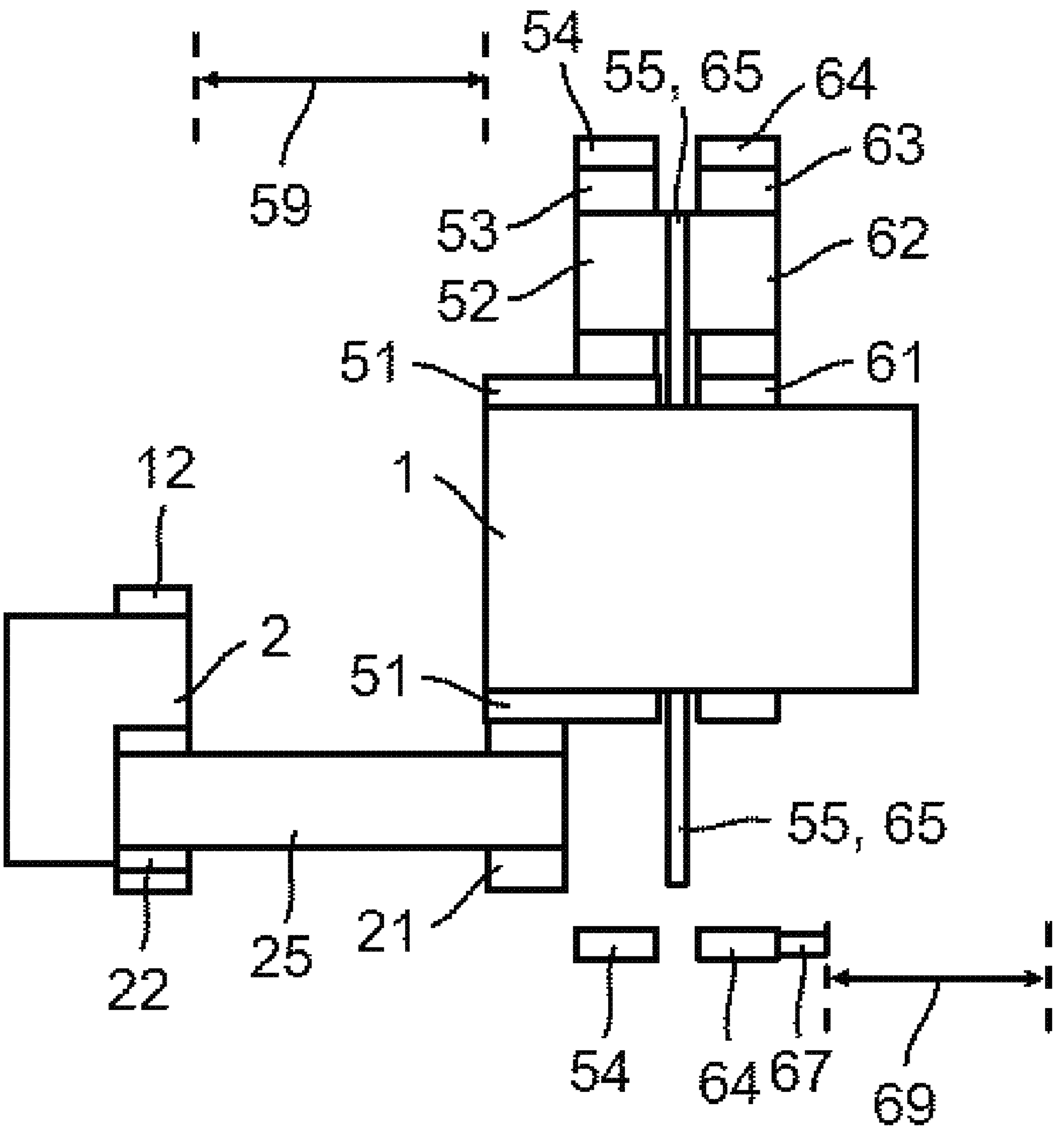
Figure 8:
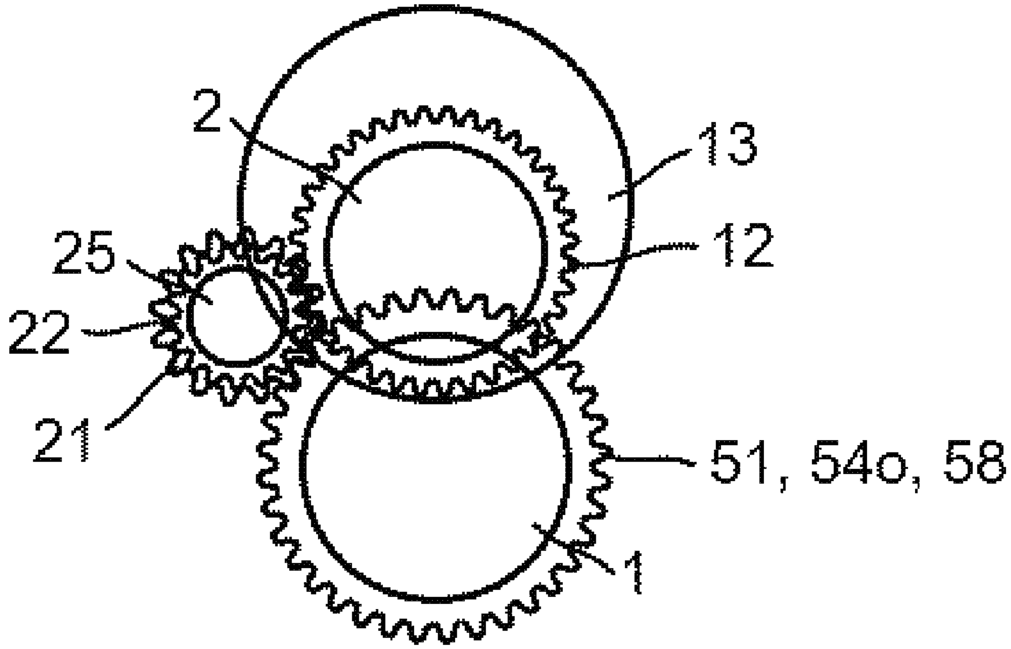

FIG. 8 illustrates a difference in which the apparatus illustrated in FIGS. 6 and 7 operates in a different way from the apparatus illustrated in FIGS. 1 to 3. The same may also apply to FIGS. 6, 7, 9 to 12, and 17 to 24.

Figure 9:
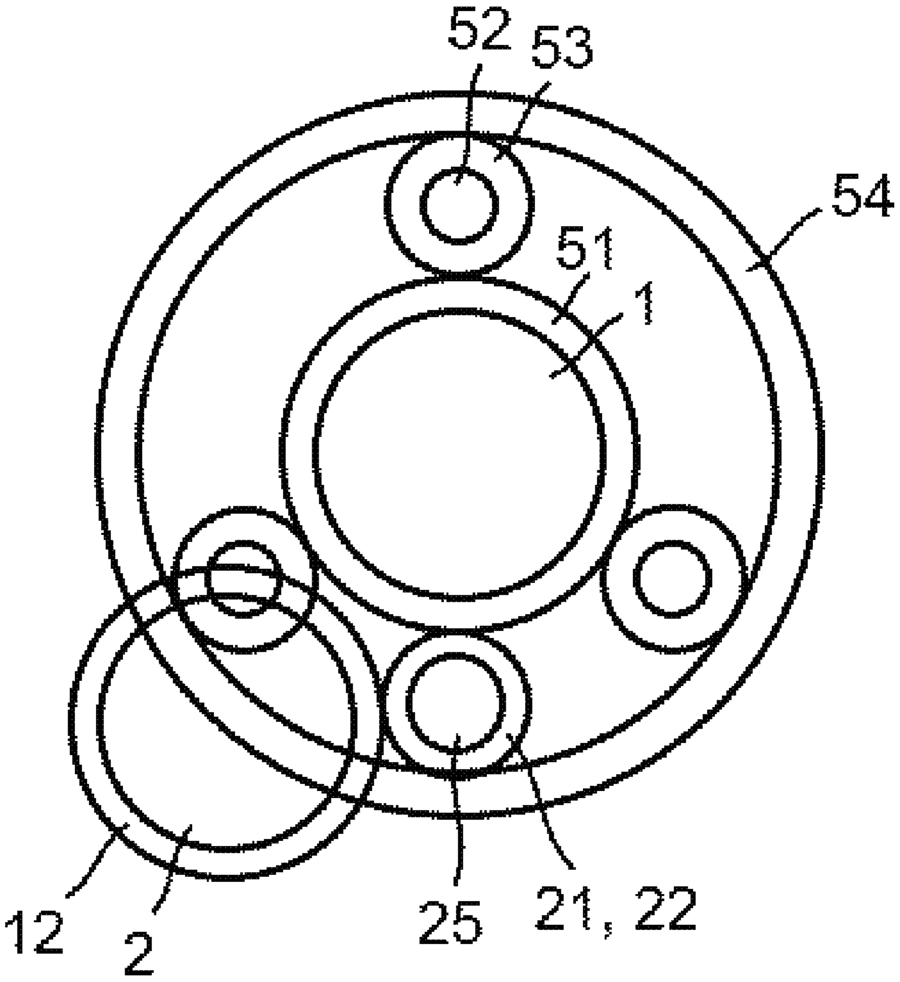
Figure 10:
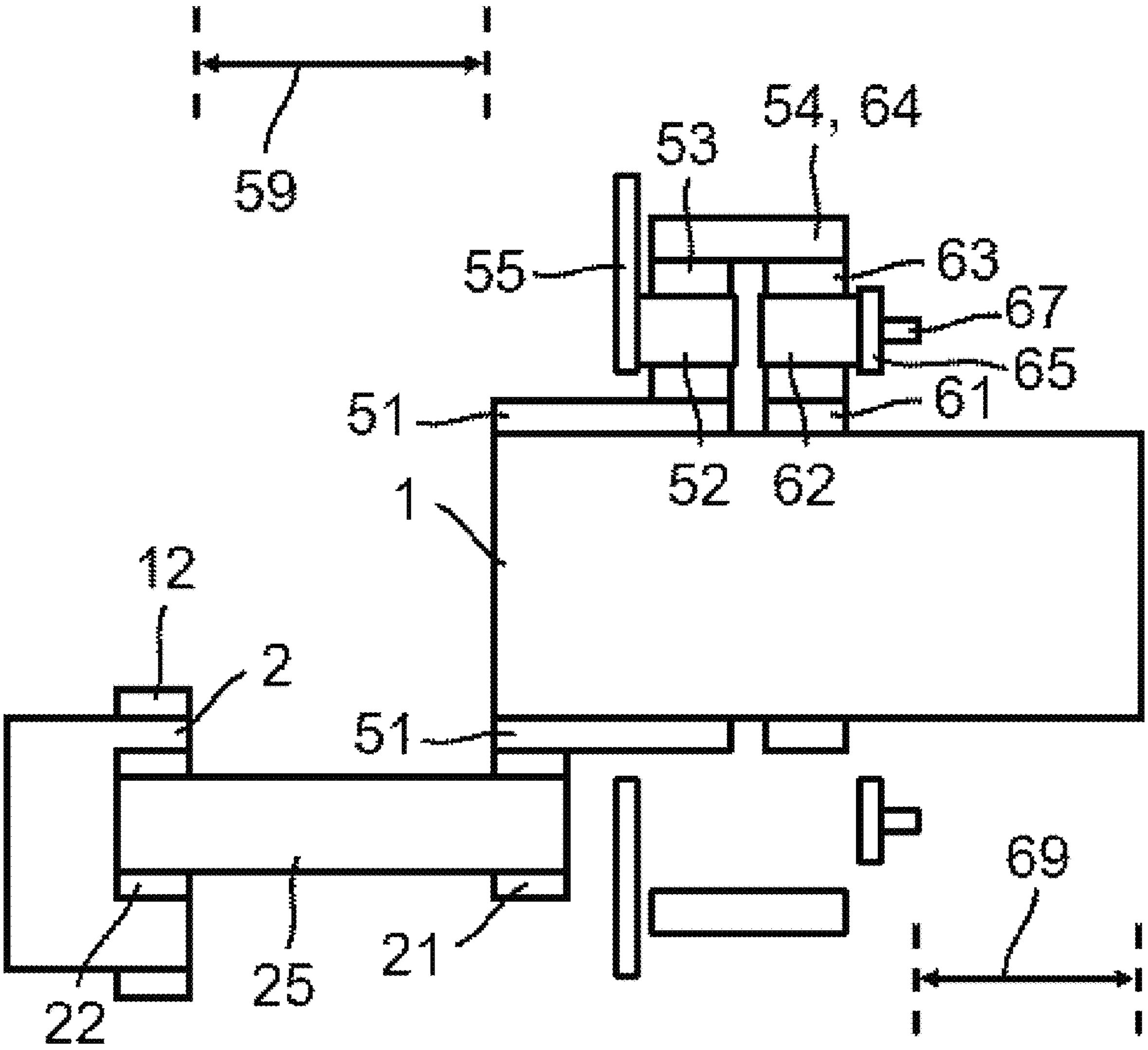

In FIGS. 9 and 10, the sun gear 51 is installed on the main journal 1 so as to idle, and the eccentric sleeve control auxiliary gear 21 engages with the sun gear 51.

The second sun gear 61 is installed on the main journal 1 so as not to idle, the second carrier 65 is fixed to the engine block by means of the fixing rod 67, and the second ring gear 64 is connected to the ring gear 54.

Figure 11:
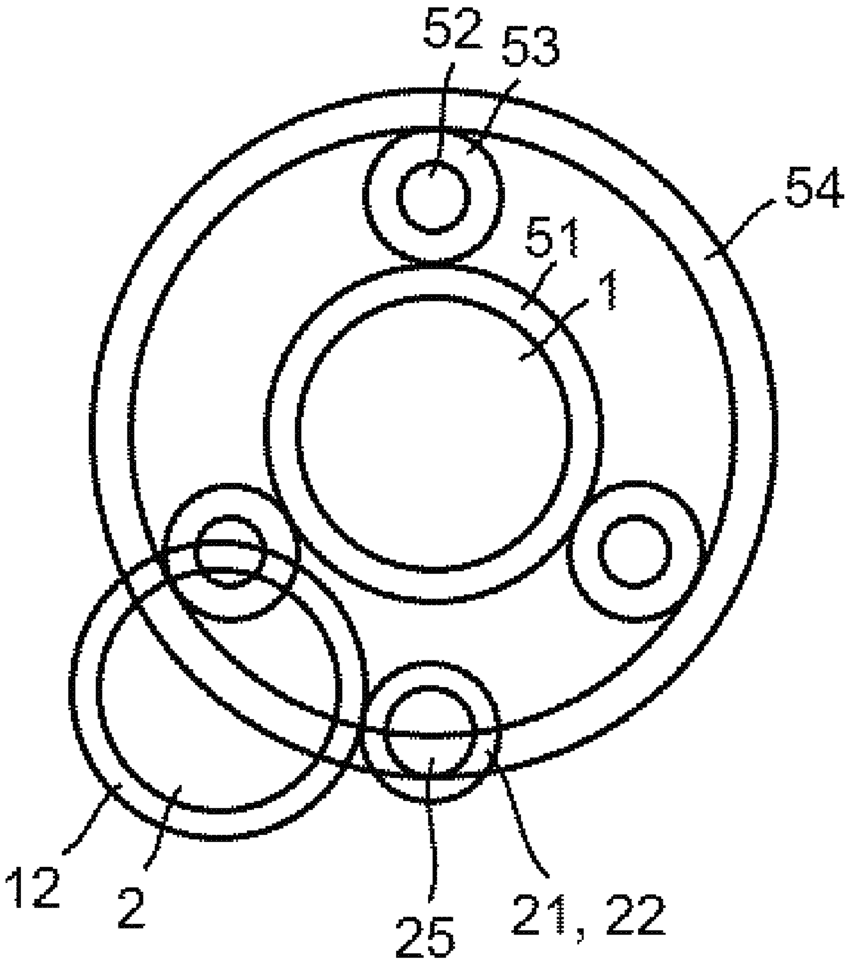
Figure 12:
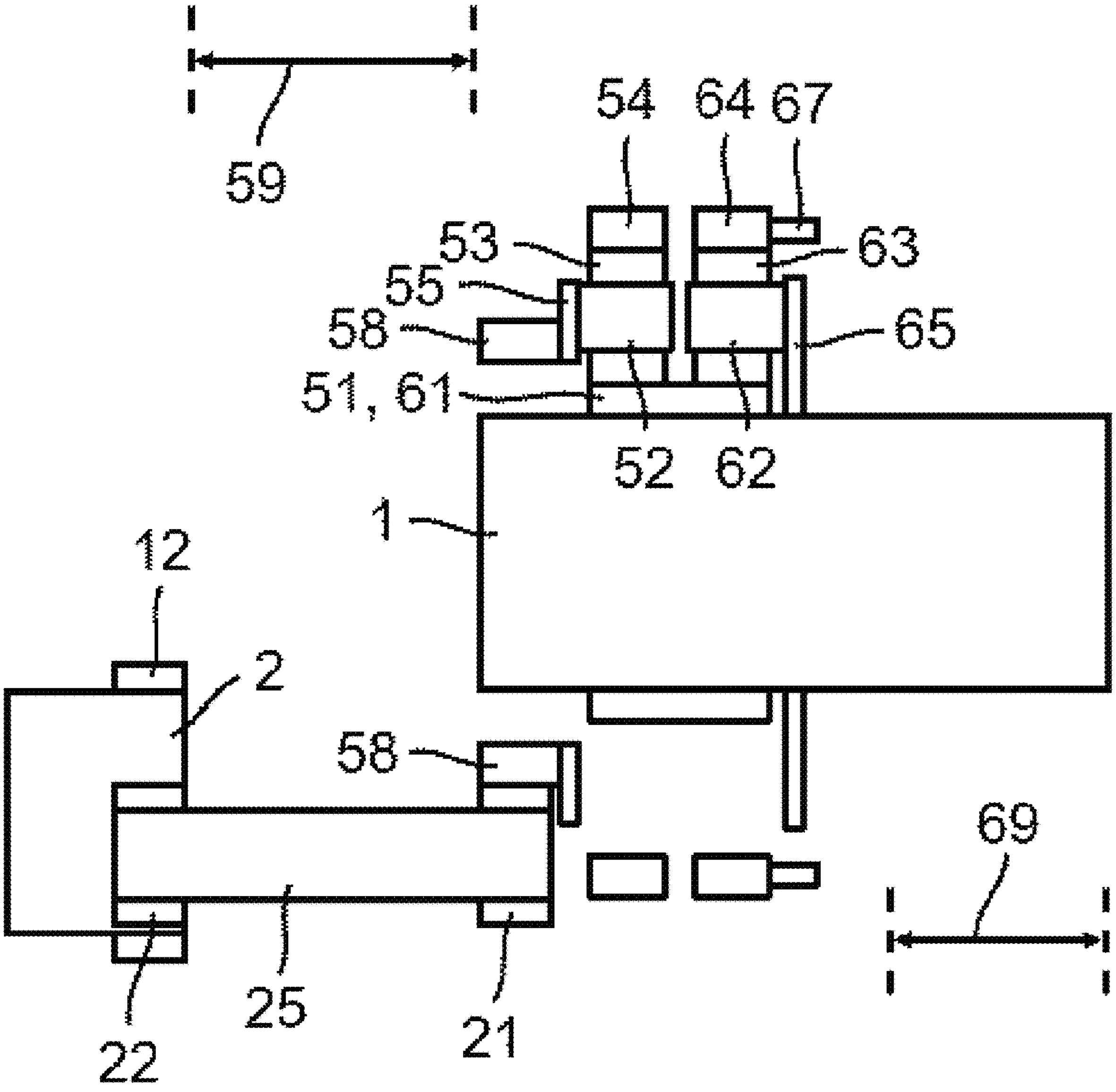

In FIGS. 11 and 12, the sun gear 51 is installed on the main journal 1 so as to idle, the carrier 55 is connected to a carrier gear 58, and the eccentric sleeve control auxiliary gear 21 engages with the carrier gear 58.

The second sun gear 61 is installed on the main journal 1 so as to idle, the second sun gear 61 is connected to the sun gear 51, the second carrier 65 is installed on the main journal 1 so as not to idle, and the second ring gear 64 is fixed to the engine block by means of the fixing rod 67.

Figure 13:
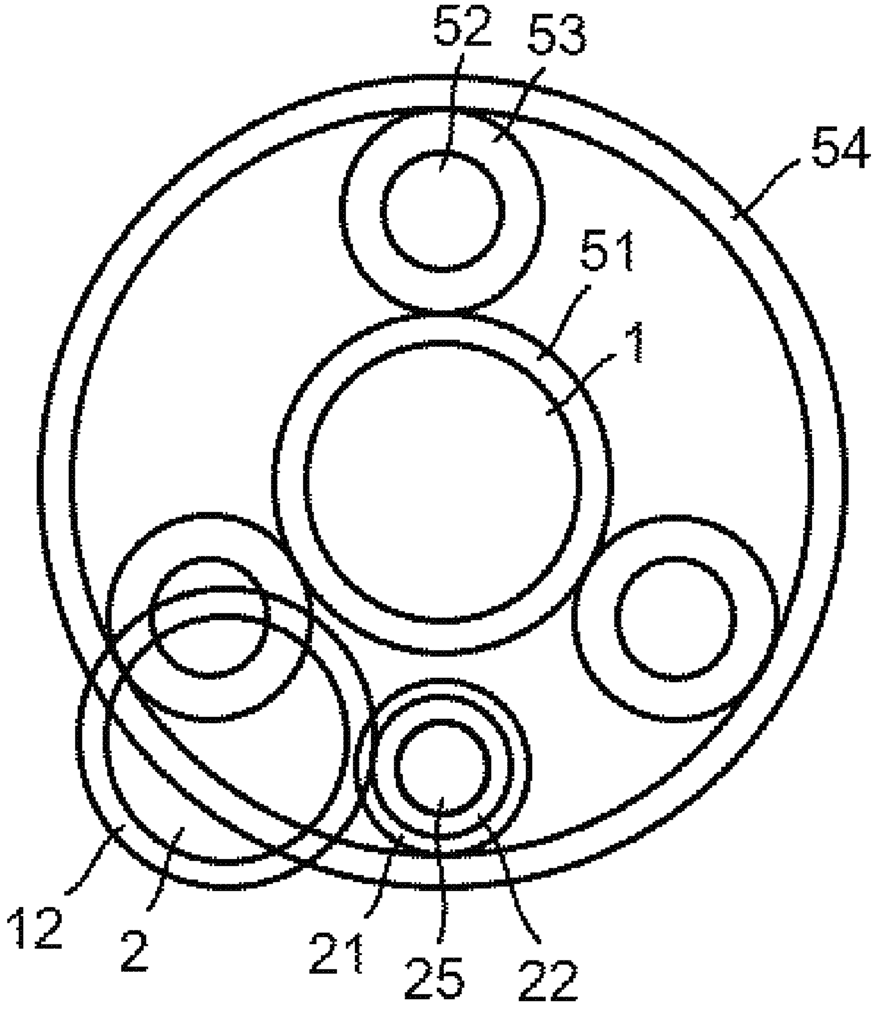
Figure 14:
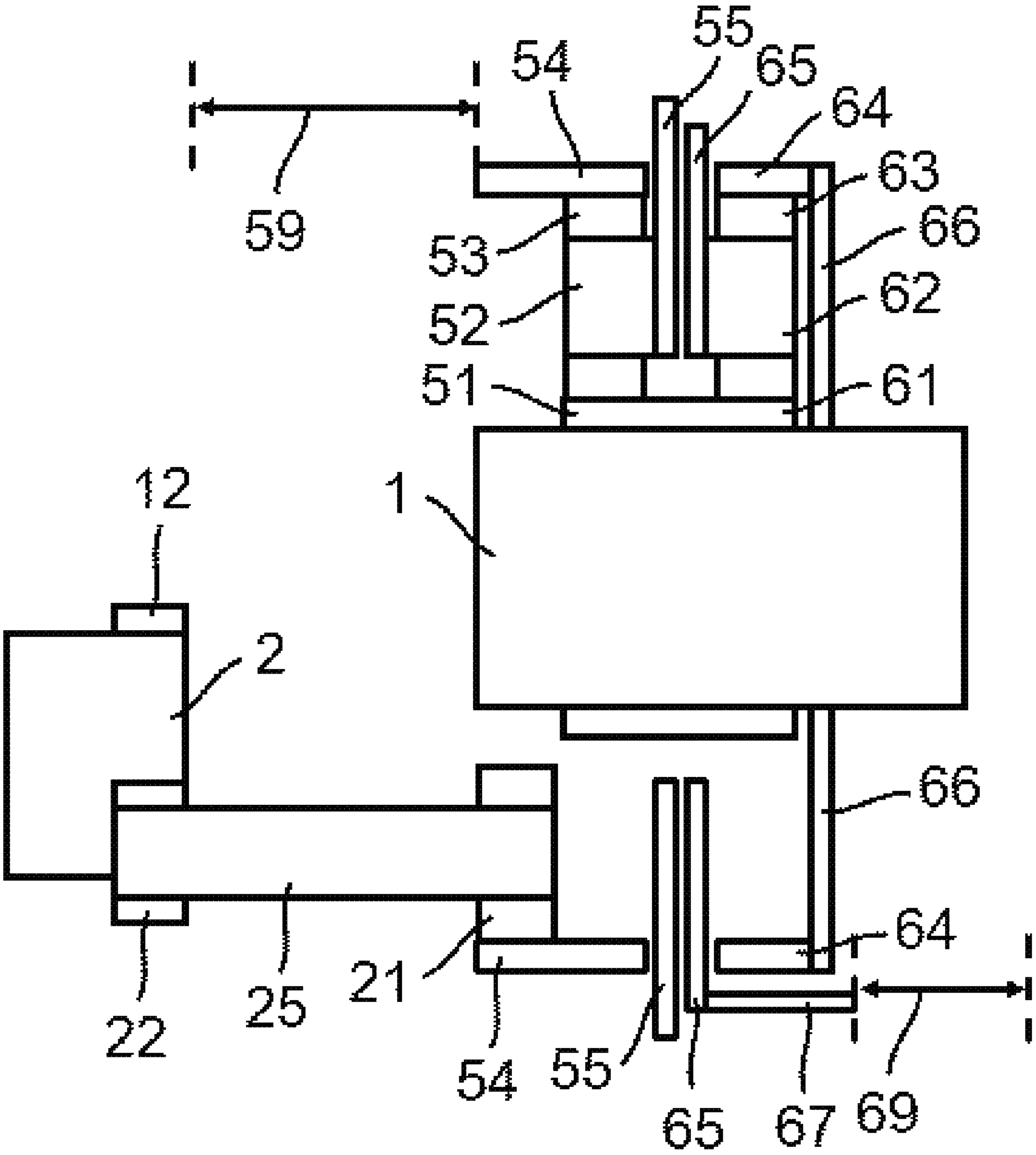

In FIGS. 13 and 14, the sun gear 51 is installed on the main journal 1 so as to idle, and the eccentric sleeve control auxiliary gear 21 engages with the ring gear 54.

The second sun gear 61 is installed on the main journal 1 so as to idle, the second sun gear 61 is connected to the sun gear 51, the second carrier 65 is fixed to the engine block by means of the fixing rod 67, the second ring gear 64 is connected to the second gear disk 66, and a second gear disk 66 is installed on the main journal 1 so as not to idle.

Figure 15:
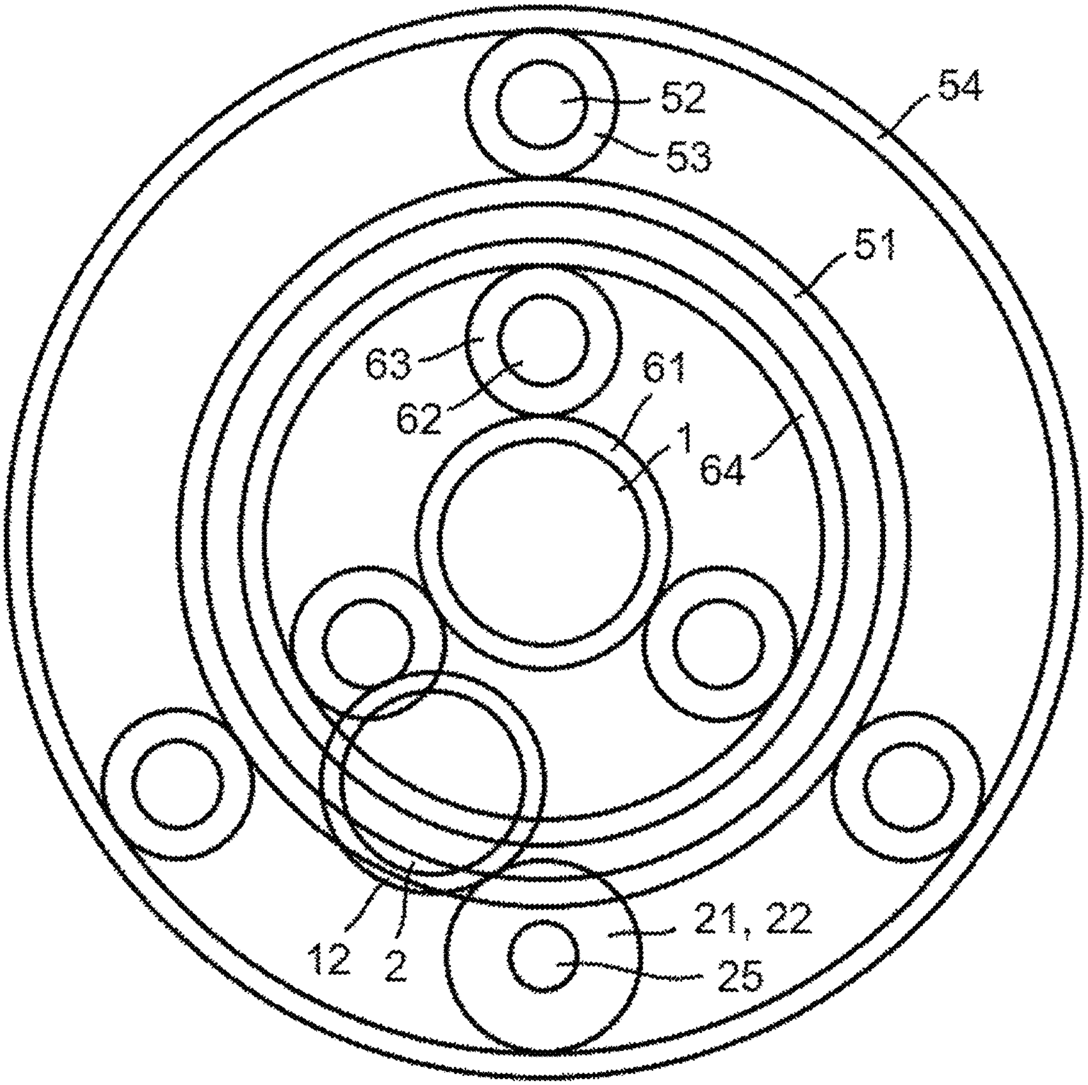
Figure 16:
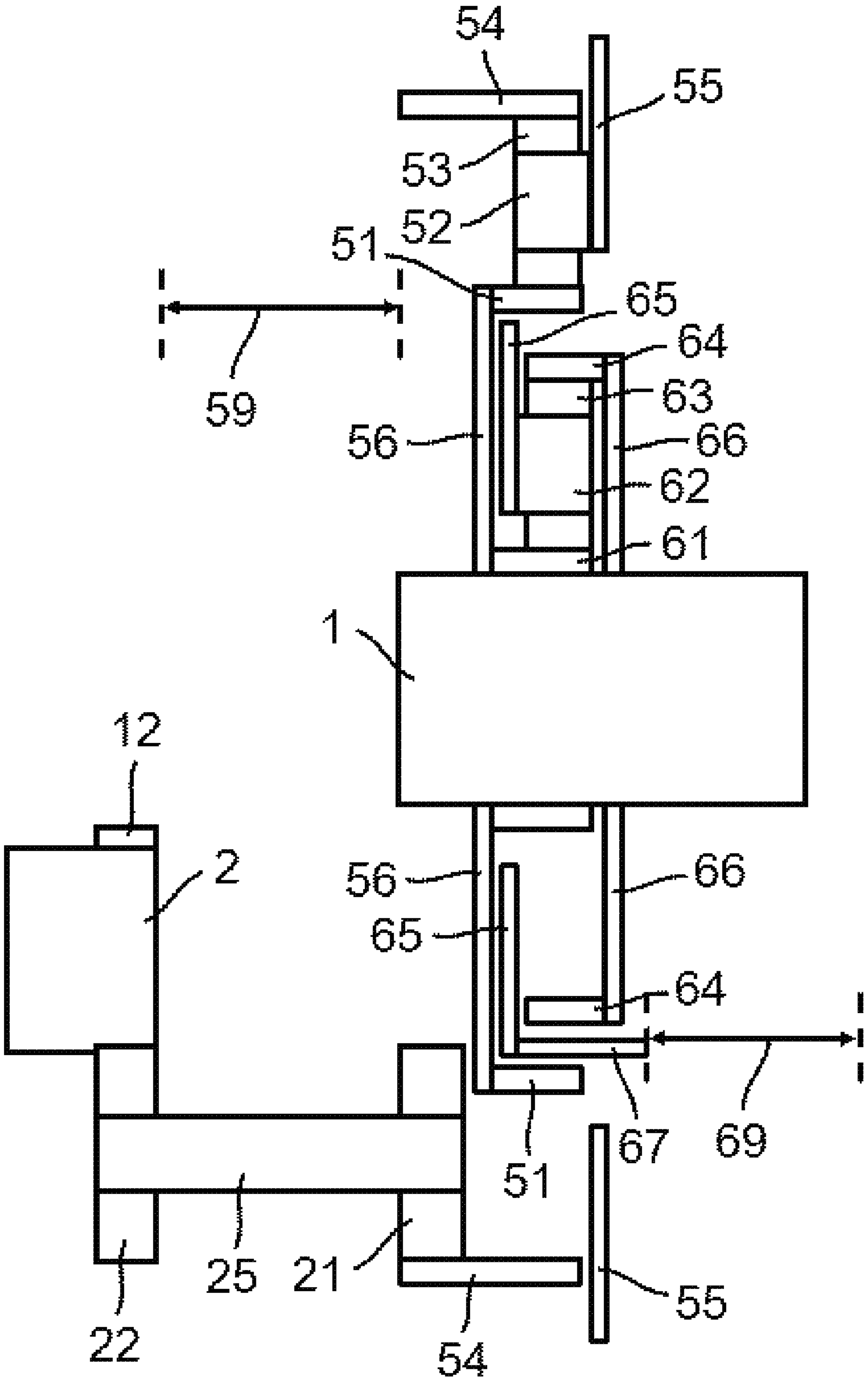

In FIGS. 15 and 16, the sun gear 51 is connected to the second sun gear 61 by means of a gear disk 56, and the eccentric sleeve control auxiliary gear 21 engages with the ring gear 54.

The second sun gear 61 is installed on the main journal 1 so as to idle, the second carrier 65 is fixed to the engine block by means of the fixing rod 67, the second ring gear 64 is connected to the second gear disk 66, and the second gear disk 66 is fixed to the main journal 1 so as not to idle.

Figure 17:
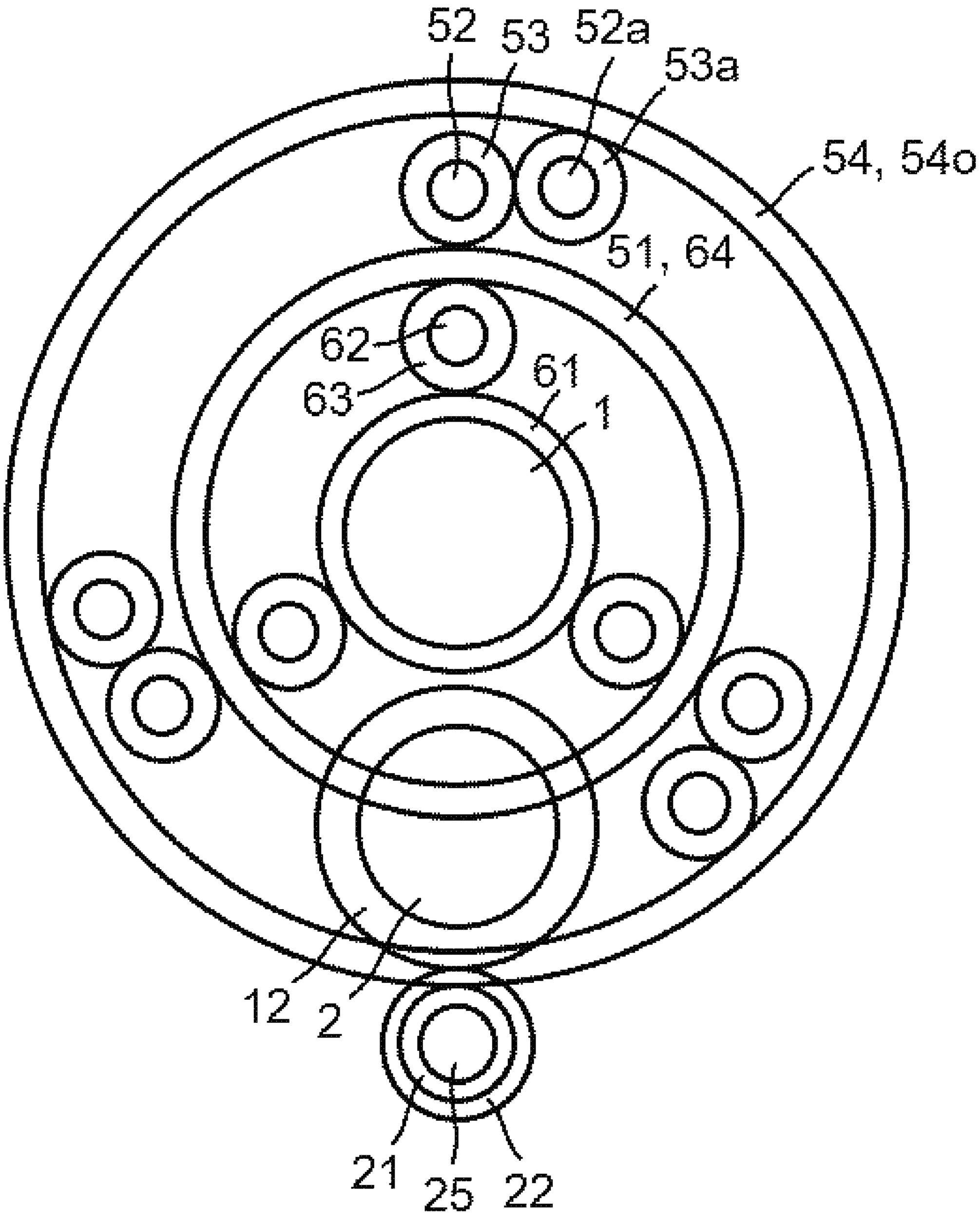
Figure 18:
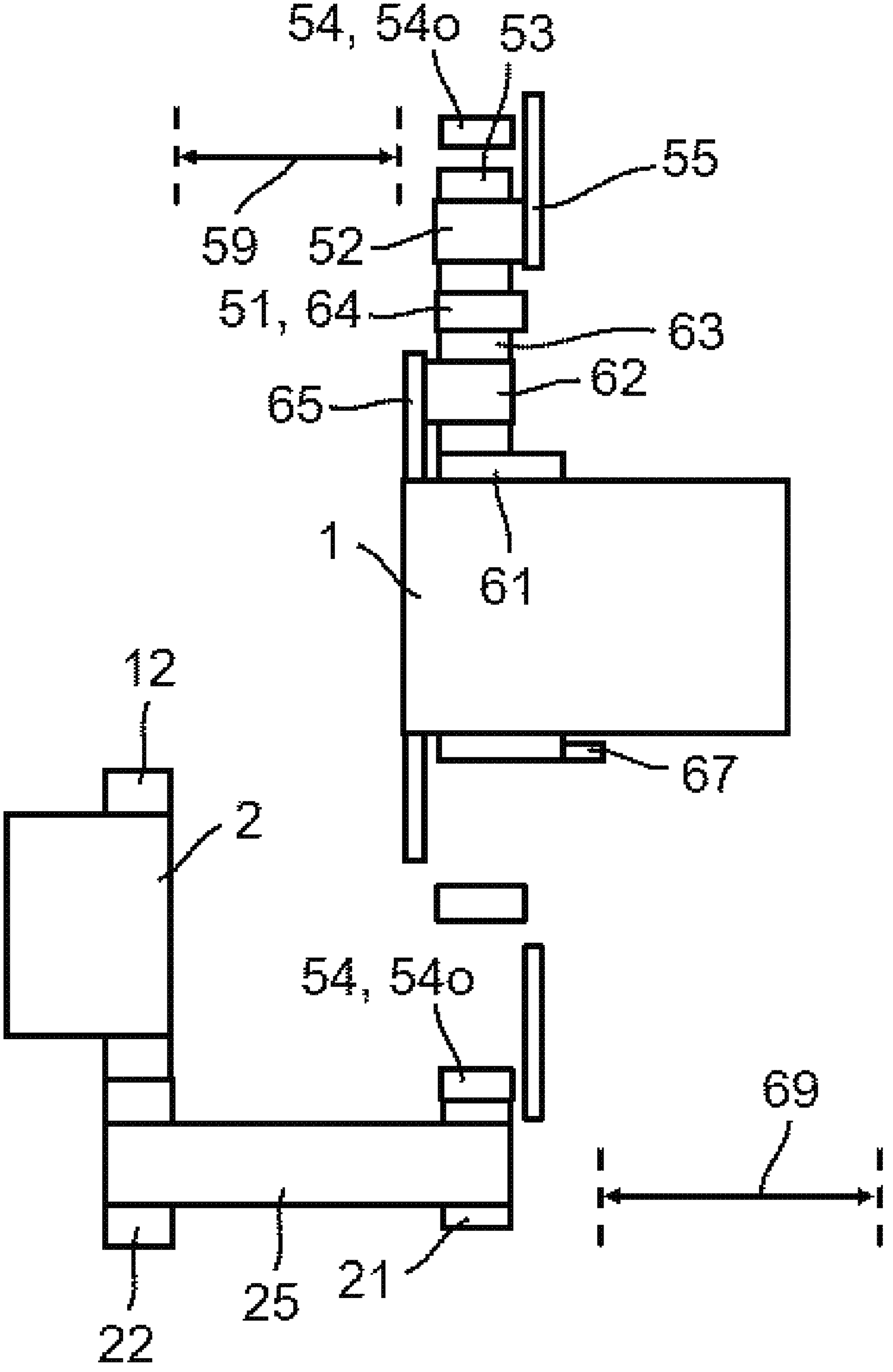

In FIGS. 17 and 18, the sun gear 51 is integrated with the second ring gear 64, such that the sun gear 51 has an external gear shape, and the second ring gear 64 has an inner gear shape. An external ring gear 54*o* is provided outside the ring gear 54, and the eccentric sleeve control auxiliary gear 21 engages with the external ring gear 54*o*.

The second sun gear 61 is installed on the main journal 1 so as to idle, the second sun gear 61 is fixed to the engine block by means of the fixing rod 67, and the second carrier 65 is installed on the main journal 1 so as not to idle.

Figure 19:
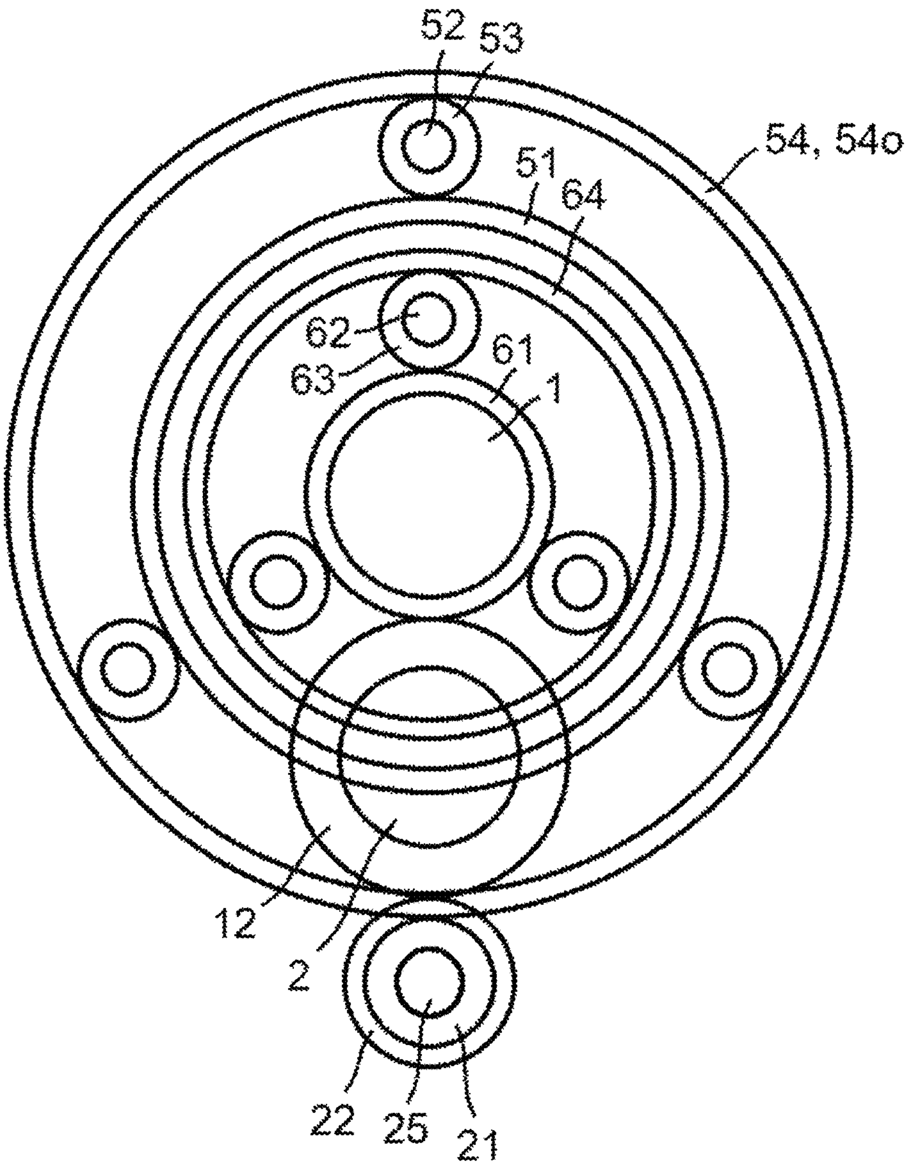
Figure 20:
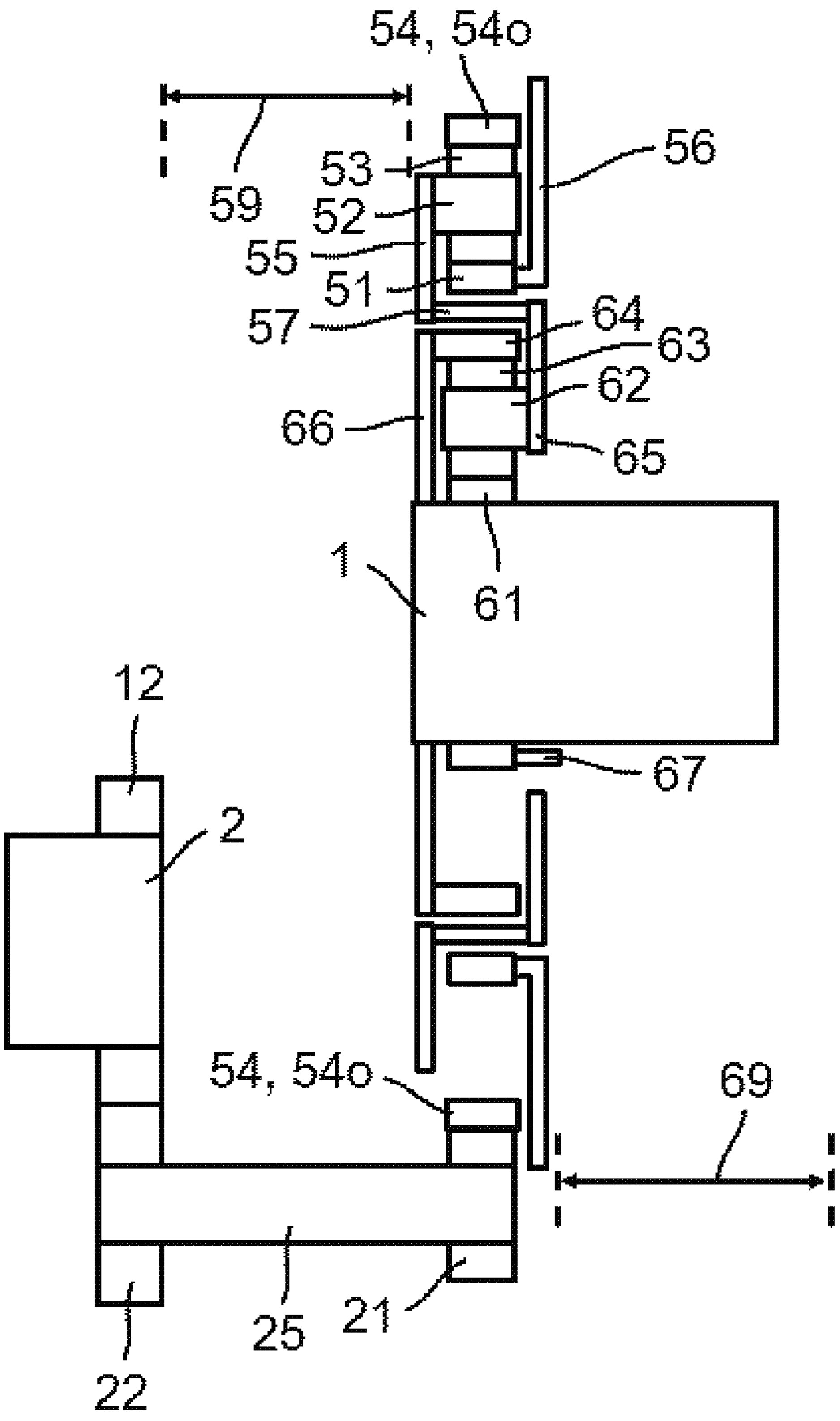

In FIGS. 19 and 20, the sun gear 51 is connected to the gear disk 56, the carrier 55 is connected to a connecting ring 57, the external ring gear 54*o* is provided outside the ring gear 54, and the eccentric sleeve control auxiliary gear 21 engages with the external ring gear 54*o*.

The second sun gear 61 is installed on the main journal 1 so as to idle, the second sun gear 61 is fixed to the engine block by means of the fixing rod 67, the second carrier 65 is connected to the connecting ring 57, the second ring gear 64 is connected to the second gear disk 66, and the second gear disk 66 is installed on the main journal 1 so as not to idle.

Figure 21:
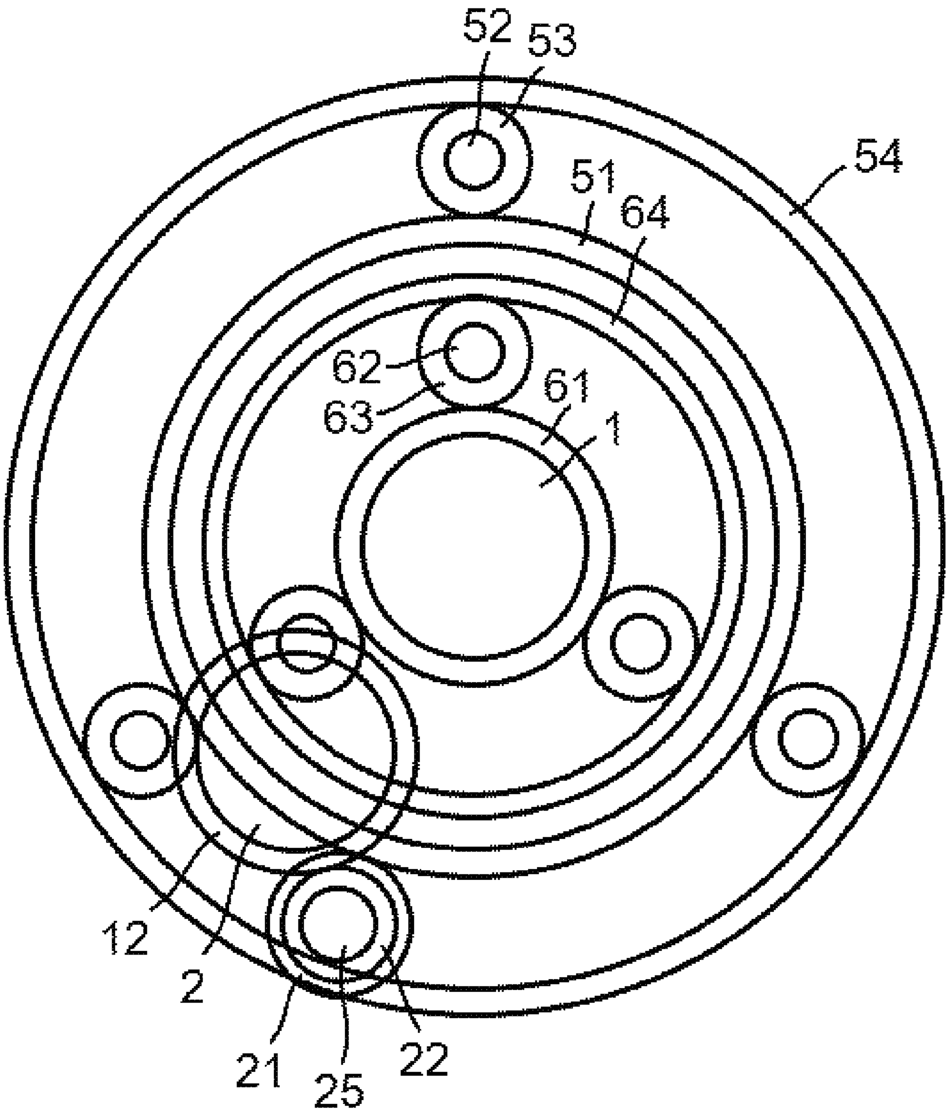
Figure 22:
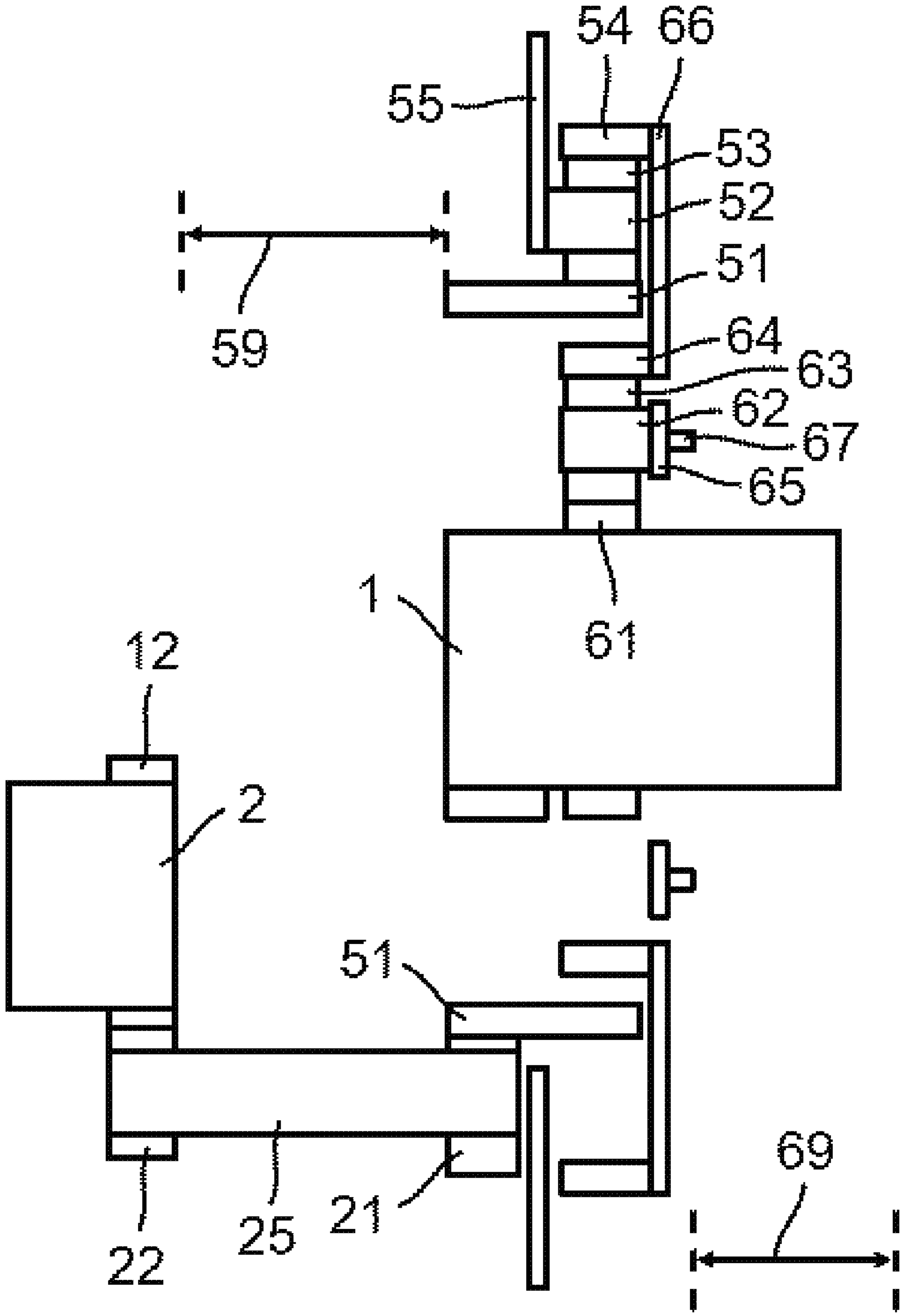

In FIGS. 21 and 22, the eccentric sleeve control auxiliary gear 21 engages with the sun gear 51.

The second sun gear 61 is installed on the main journal 1 so as not to idle, the second carrier 65 is fixed to the engine block by means of the fixing rod 67, and the second ring gear 64 is connected to the ring gear 54 by means of the second gear disk 66.

Figure 23:
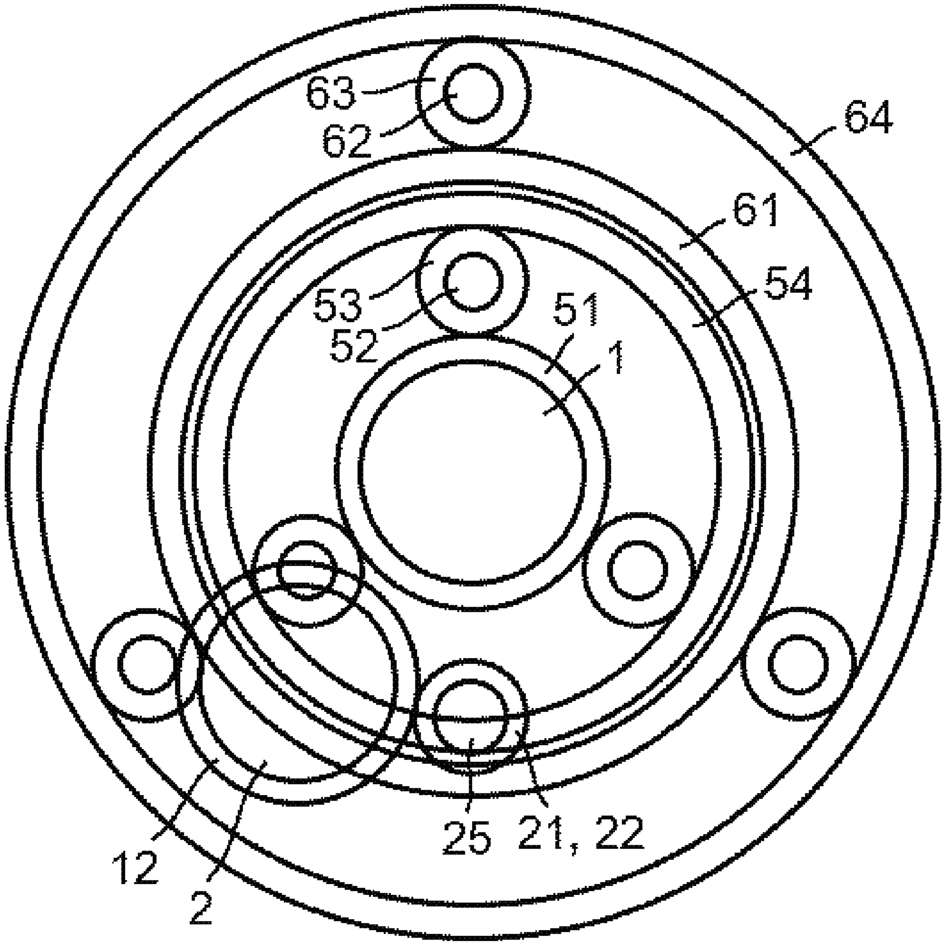
Figure 24:
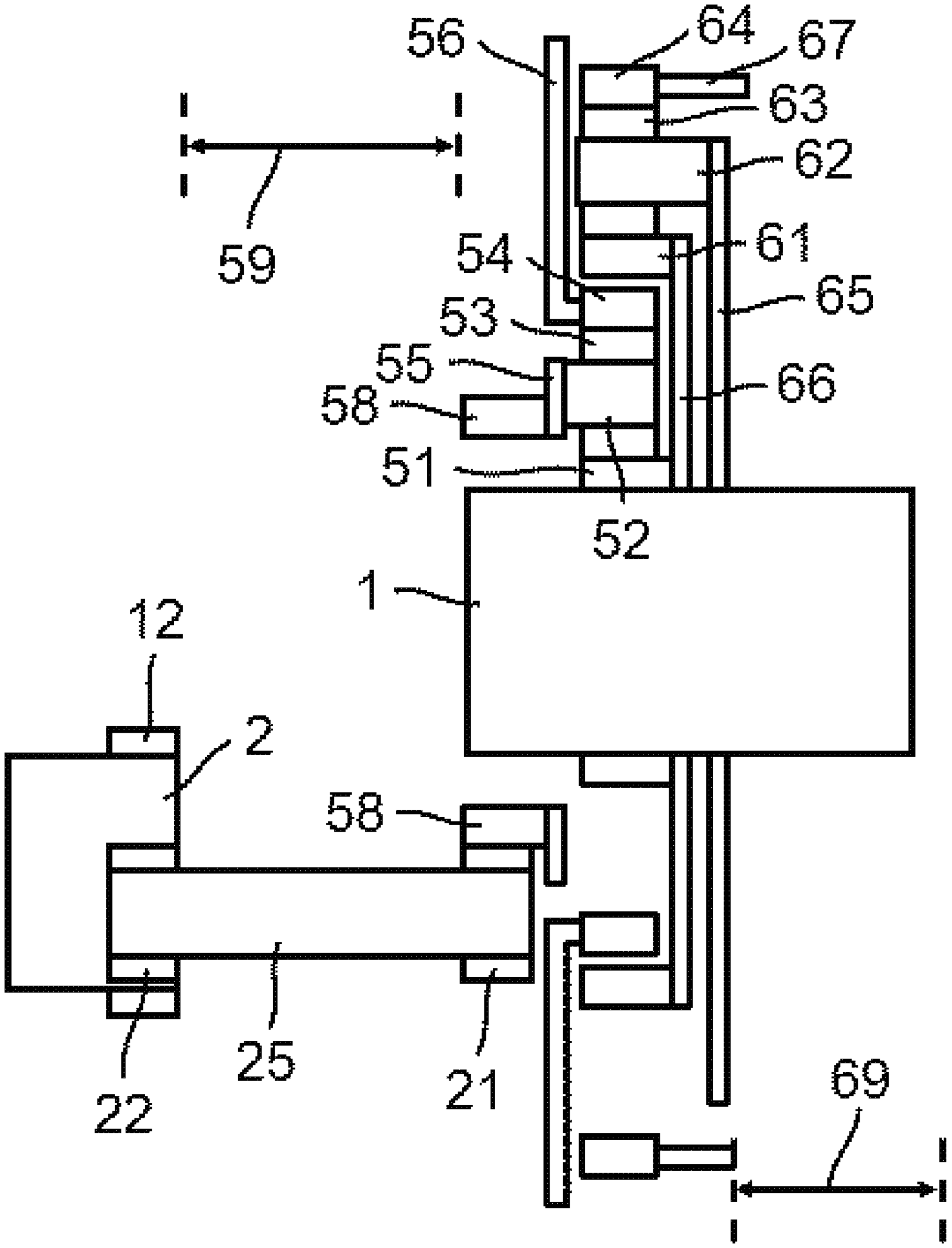

In FIGS. 23 and 24, the sun gear 51 is installed on the main journal 1 so as to idle, the carrier 55 is connected to the carrier gear 58, the ring gear 54 is connected to the gear disk 56, and the eccentric sleeve control auxiliary gear 21 engages with the carrier gear 58.

The second sun gear 61 is connected to the second gear disk 66, the second gear disk 66 is connected to the sun gear 51, the second carrier 65 is installed on the main journal 1 so as not to idle, and the second ring gear 64 is fixed to the engine block by means of the fixing rod 67.

Figure 25:
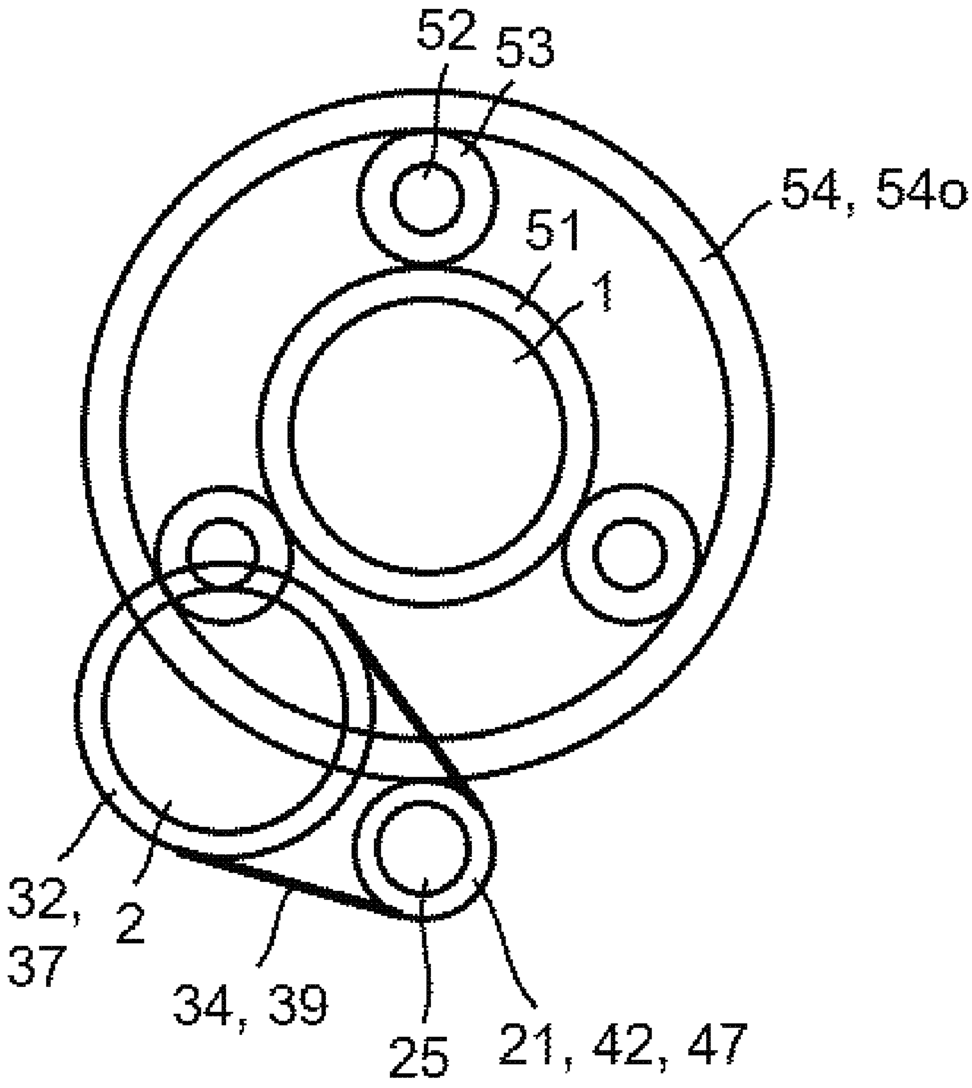
Figure 26:
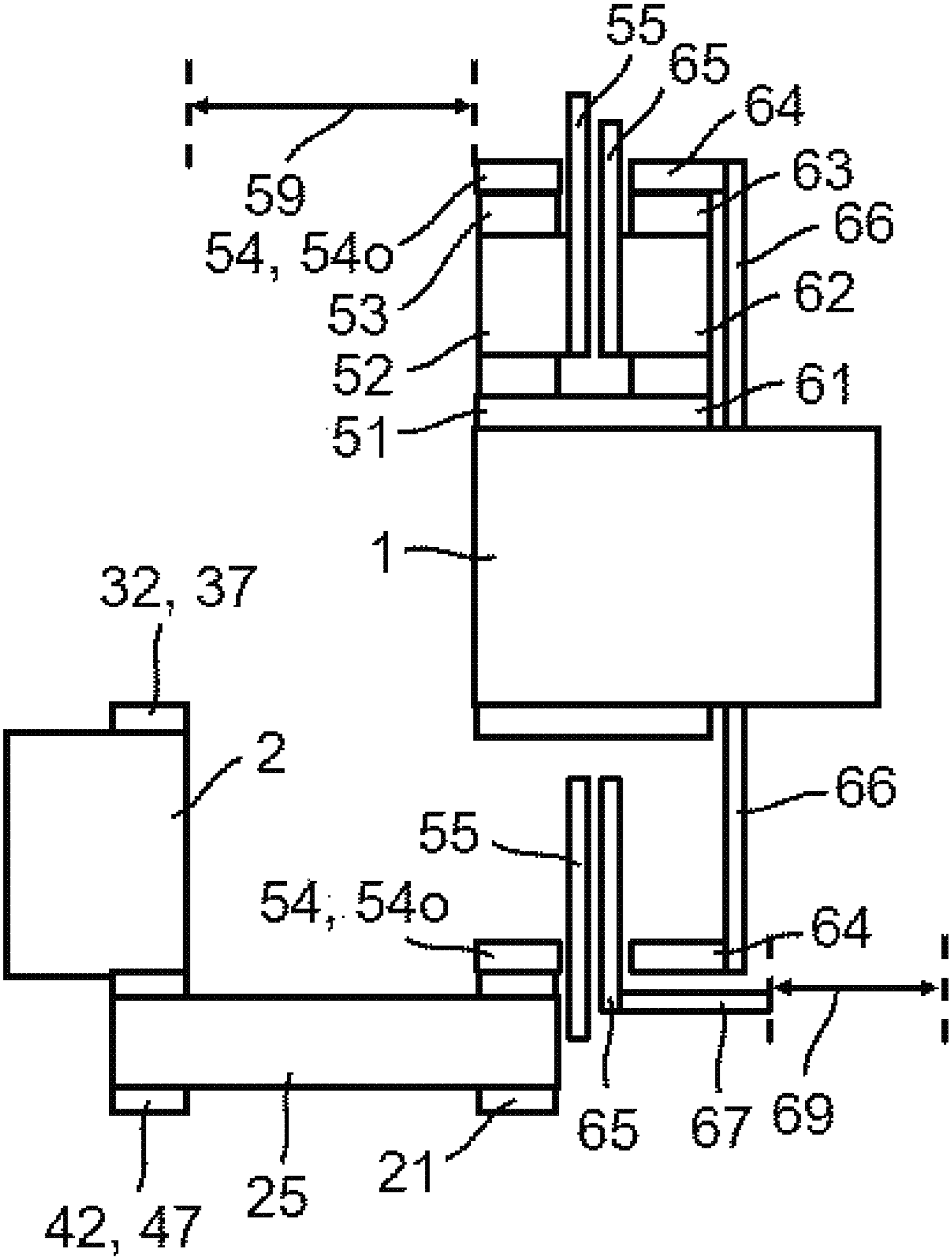

In FIGS. 25 and 26, the sun gear 51 is installed on the main journal 1 so as to idle, the external ring gear 54*o* is provided outside the ring gear 54, and the eccentric sleeve control auxiliary gear 21 engages with the external ring gear 54*o*.

The second sun gear 61 is installed on the main journal 1 so as to idle, the second sun gear 61 is connected to the sun gear 51, the second carrier 65 is fixed to the engine block by means of the fixing rod 67, the second ring gear 64 is connected to the second gear disk 66, and the second gear disk 66 is installed on the main journal 1 so as not to idle.

Figure 27:
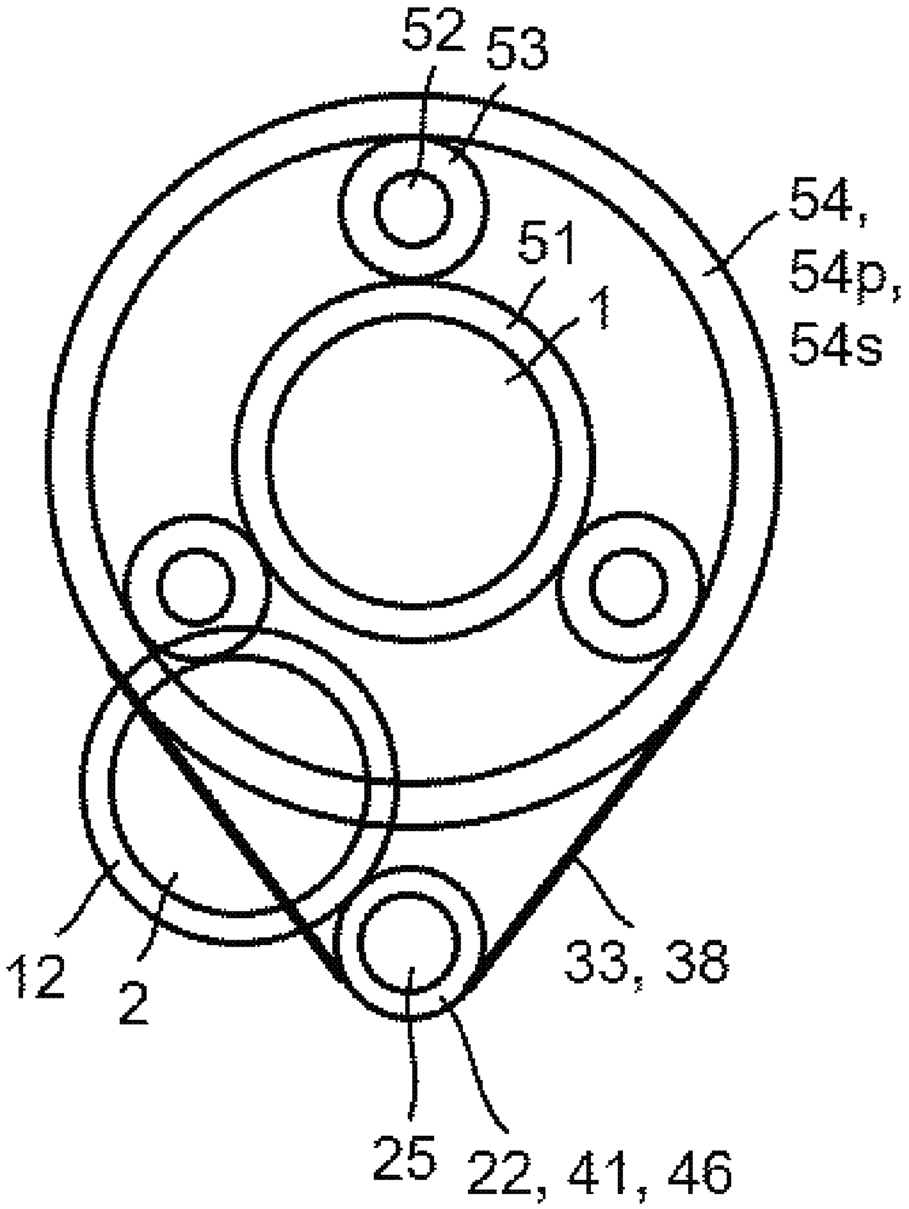
Figure 28:
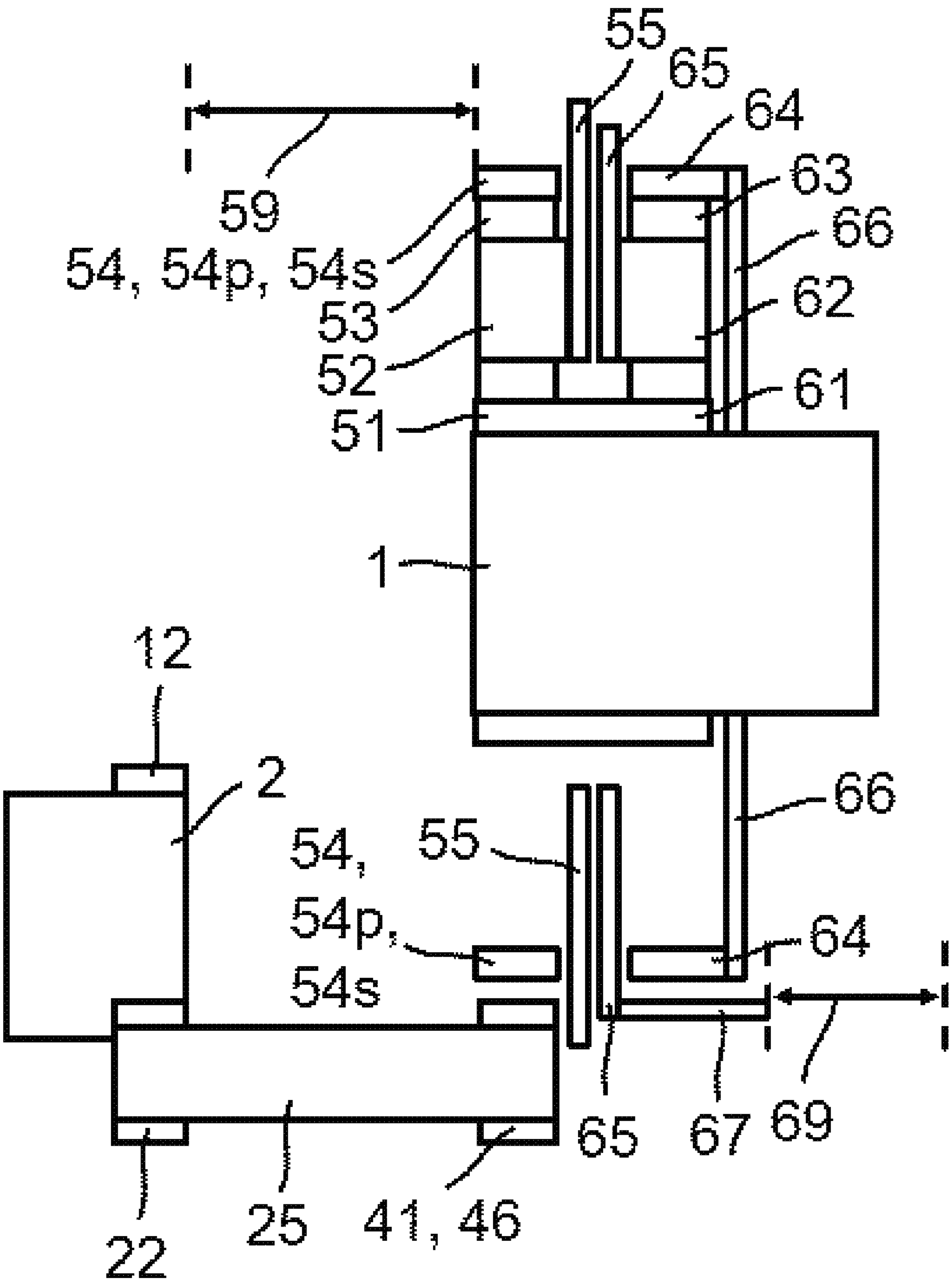

In FIGS. 27 and 28, the sun gear 51 is installed on the main journal 1 so as to idle, an external ring timing pulley 54*p* or an external ring sprocket 54*s* is provided outside the ring gear 54, the external ring timing pulley 54*p* is connected to the eccentric sleeve control auxiliary timing pulley 41 by means of the first timing belt 33, and the external ring sprocket 54*s* is connected to the eccentric sleeve control auxiliary sprocket 46 by means of the first timing chain 38.

The second sun gear 61 is installed on the main journal 1 so as to idle, the second sun gear 61 is connected to the sun gear 51, the second carrier 65 is fixed to the engine block by means of the fixing rod 67, the second ring gear 64 is connected to the second gear disk 66, and the second gear disk 66 is installed on the main journal 1 so as not to idle.

Figure 29:
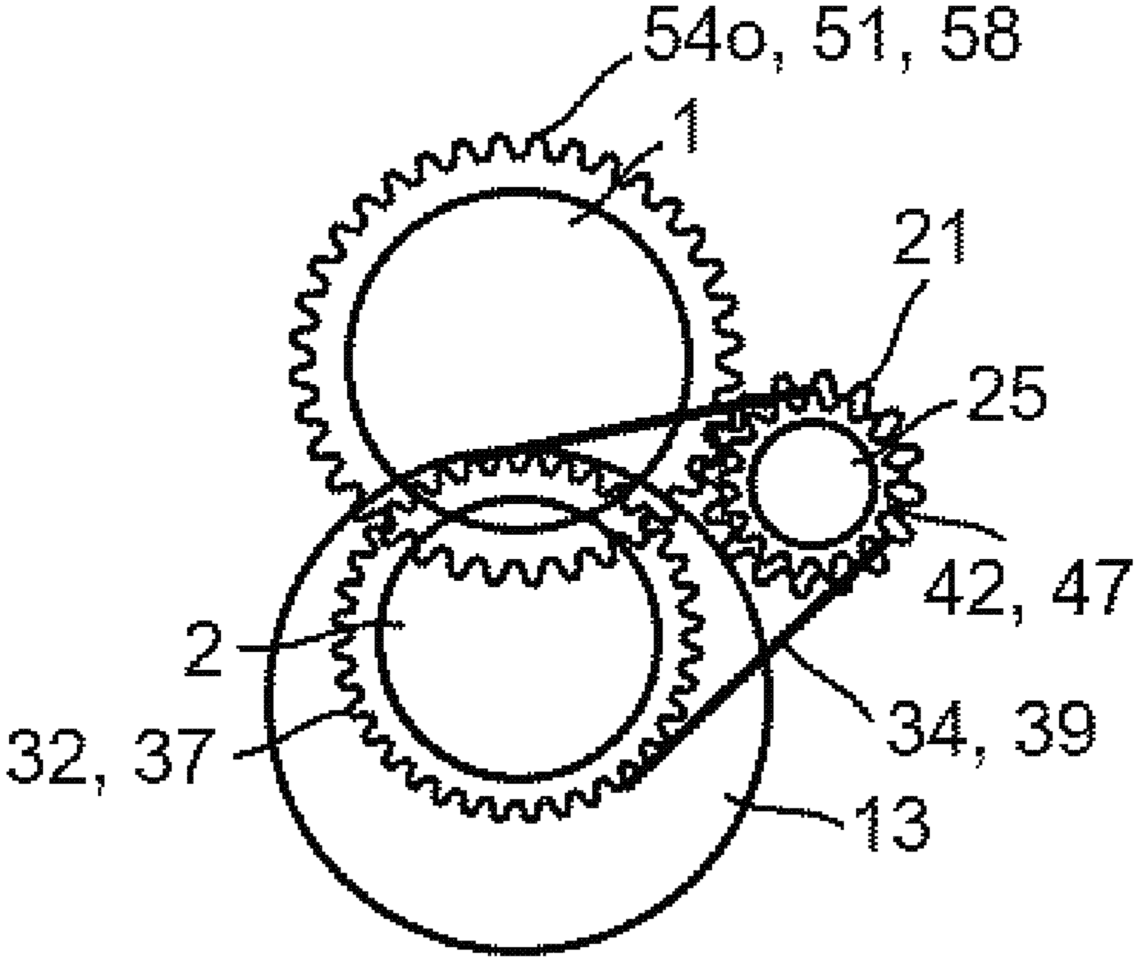

FIG. 29 illustrates connection relationships in FIGS. 25 and 26 that may be visible when FIGS. 6, 7, 9 to 12, and 17 to 24 are changed. FIG. 29 illustrates that the external ring gear 54*o* and the eccentric sleeve control auxiliary gear 21 engage with each other, the sun gear 51 and the eccentric sleeve control auxiliary gear 21 engage with each other, the carrier gear 58 and the eccentric sleeve control auxiliary gear 21 engage with each other, the eccentric sleeve timing pulley 32 and the eccentric sleeve auxiliary timing pulley 42 are connected to each other by using the second timing belt 34, and the eccentric sleeve sprocket 37 and the eccentric sleeve auxiliary sprocket 47 are connected to each other by using the second timing chain 39.

Figure 30:
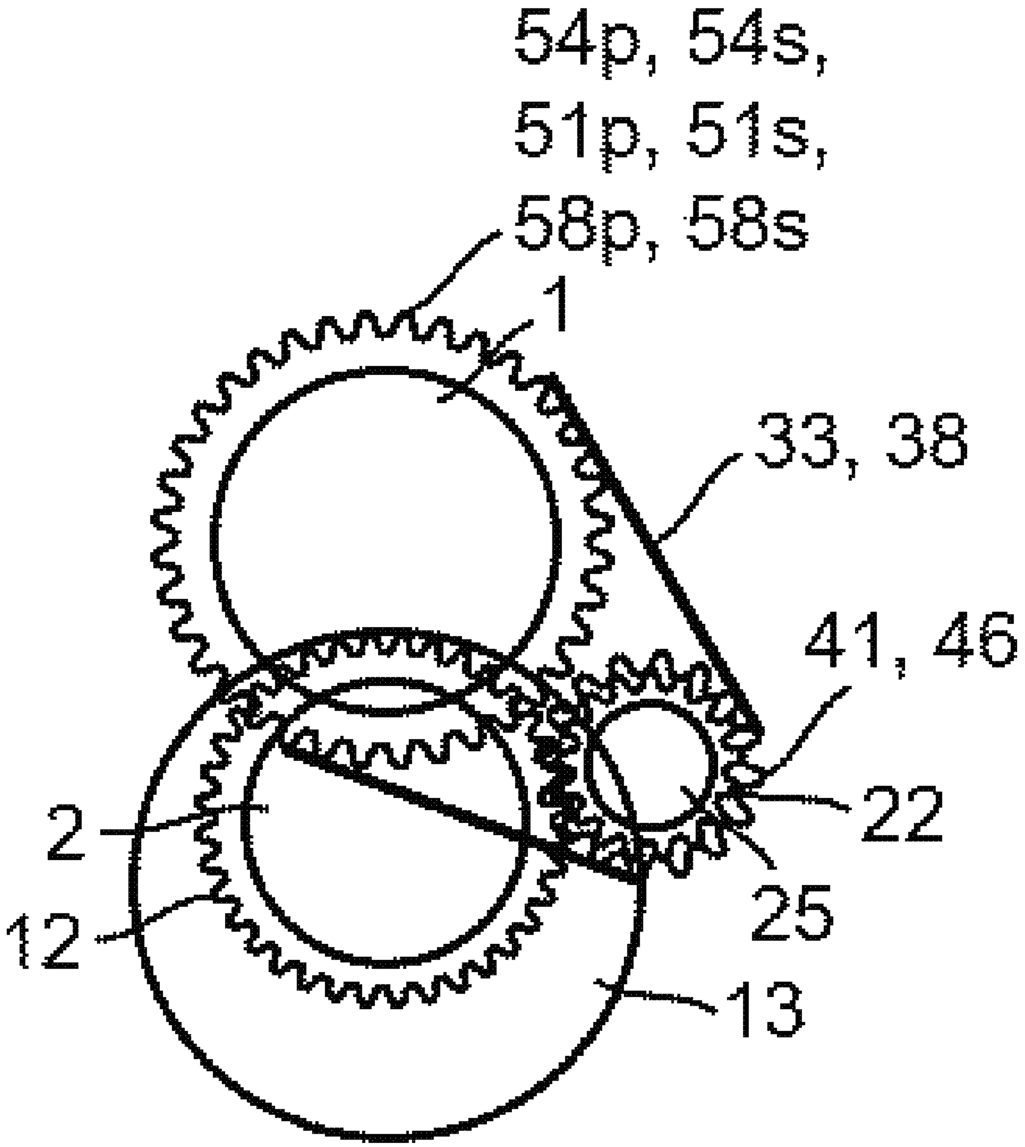

FIG. 30 illustrates connection relationships in FIGS. 27 and 28 that may be visible when FIGS. 6, 7, and 9 to 24 are changed. FIG. 30 illustrates that the external ring timing pulley 54*p* and the eccentric sleeve control auxiliary timing pulley 41 are connected to each other by using the first timing belt 33, a sun timing pulley 51*p* and the eccentric sleeve control auxiliary timing pulley 41 by using the first timing belt 33, a carrier timing pulley 58*p* and the eccentric sleeve control auxiliary timing pulley 41 are connected to each other by using the first timing belt 33, the external ring sprocket 54*s* and the eccentric sleeve control auxiliary sprocket 46 are connected to each other by using the first timing chain 38, a sun sprocket 51*s* and the eccentric sleeve control auxiliary sprocket 46 are connected to each other by using the first timing chain 38, a carrier sprocket 58*s* and the eccentric sleeve control auxiliary sprocket 46 are connected to each other by using the first timing chain 38, and the eccentric sleeve gear 12 and the eccentric sleeve auxiliary gear 22 engage with each other.

Figure 31:
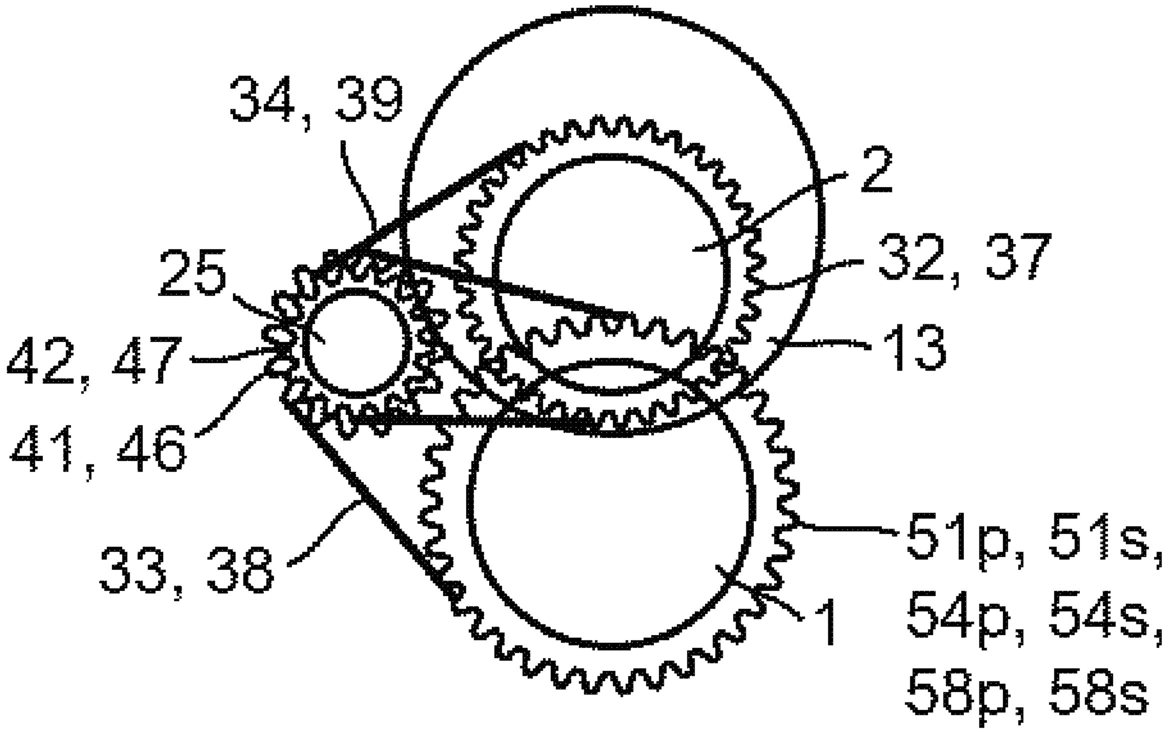

FIG. 31 illustrates an additional change in addition to the changes illustrated in FIG. 30 in respect to FIGS. 6, 7, and 9 to 24 and illustrates that the eccentric sleeve timing pulley 32 and the eccentric sleeve auxiliary timing pulley 42 are connected to each other by the second timing belt 34, and the eccentric sleeve sprocket 37 and the eccentric sleeve auxiliary sprocket 47 are connected to each other by the second timing chain 39. In addition, in the state in FIG. 30, FIG. 31 illustrates that the main journal 1, the sun timing pulley 51*p*, the sun sprocket 51*s*, the external ring timing pulley 54*p*, the external ring sprocket 54*s*, the carrier timing pulley 58*p*, and the carrier sprocket 58*s* are rotated by half a turn, and the posture of the eccentric sleeve 13 is changed.

Figure 32:
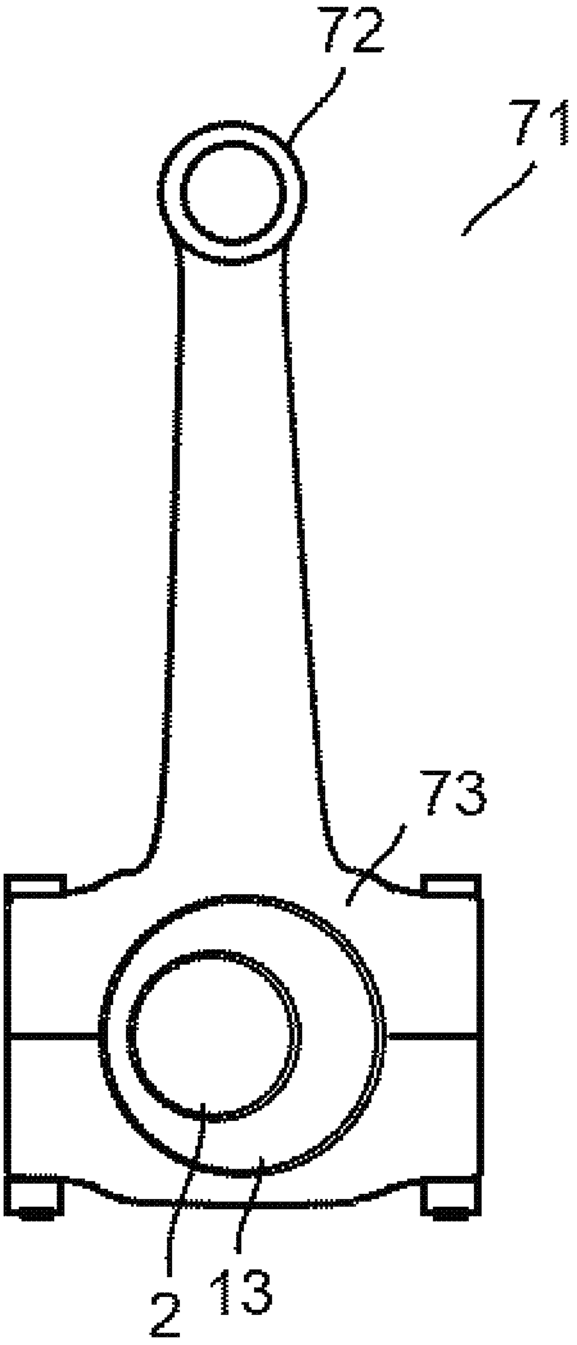
Figure 33:
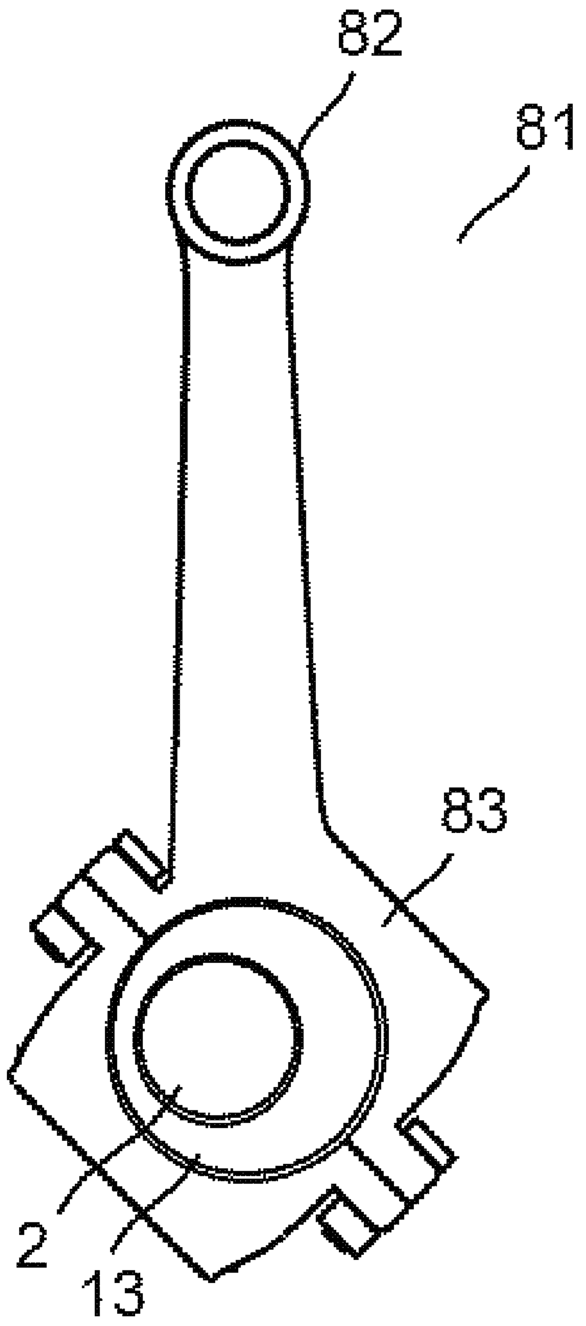

FIGS. 32 and 33 illustrate examples of connecting rods 71 and 81. There are small ends 72 and 82 and big ends 73 and 83. Cross-sections of the crankpin 2 and the eccentric sleeve 13 are shown in large holes of the big ends 73 and 83. It can be seen that when the posture of the eccentric sleeve 13 is changed in the state in which the position of the crankpin 2 is fixed, the positions of the big ends 73 and 83 are changed, and distances from a center of the crankpin 2 to the small ends 72 and 82 are changed. Even though the crank arm 3 and the main journal 1 are not illustrated, distances and angles at which centers of the big ends 73 and 83 are spaced apart from the center of the main journal 1 are also changed.

Figure 34:
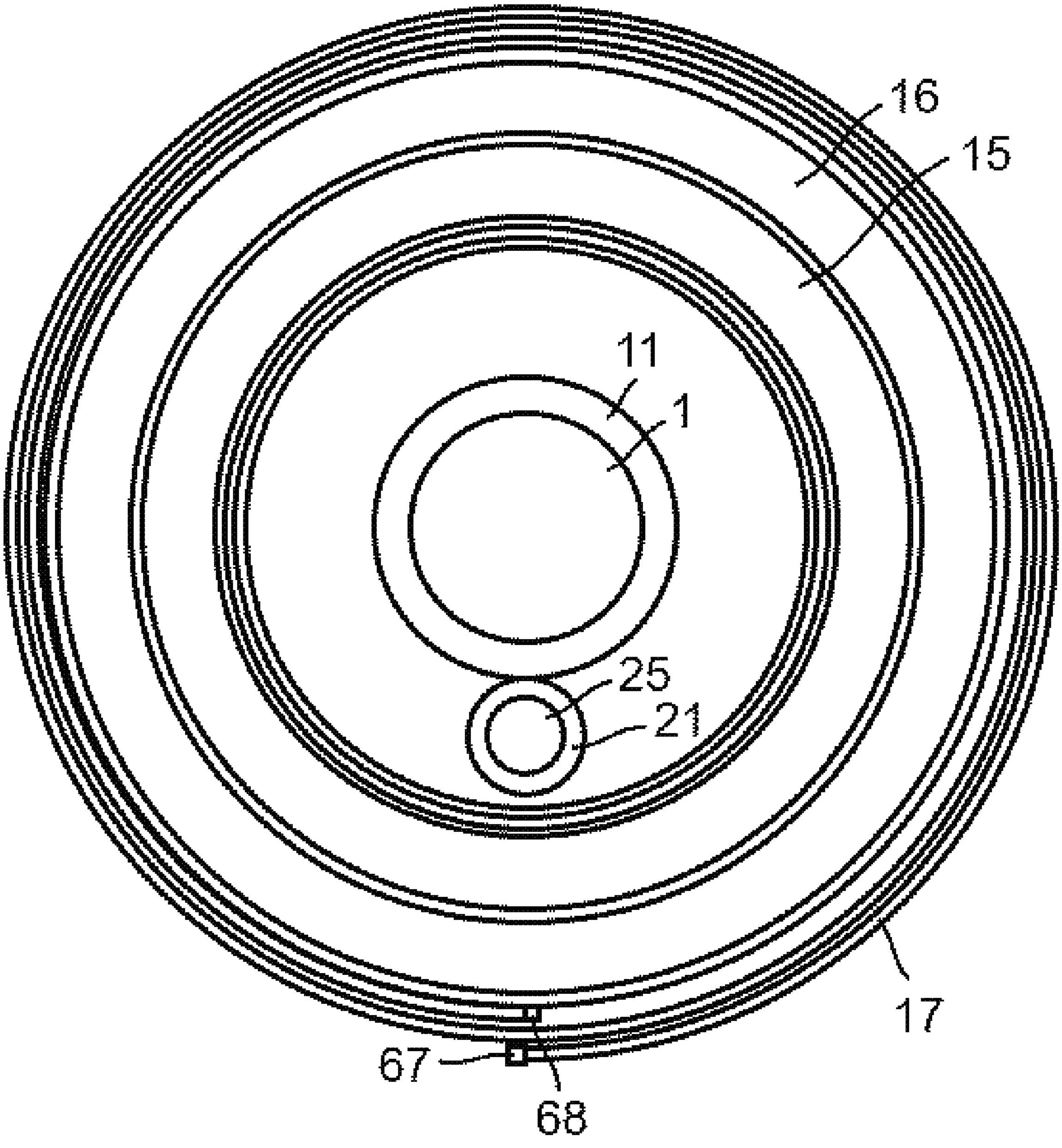
Figure 35:
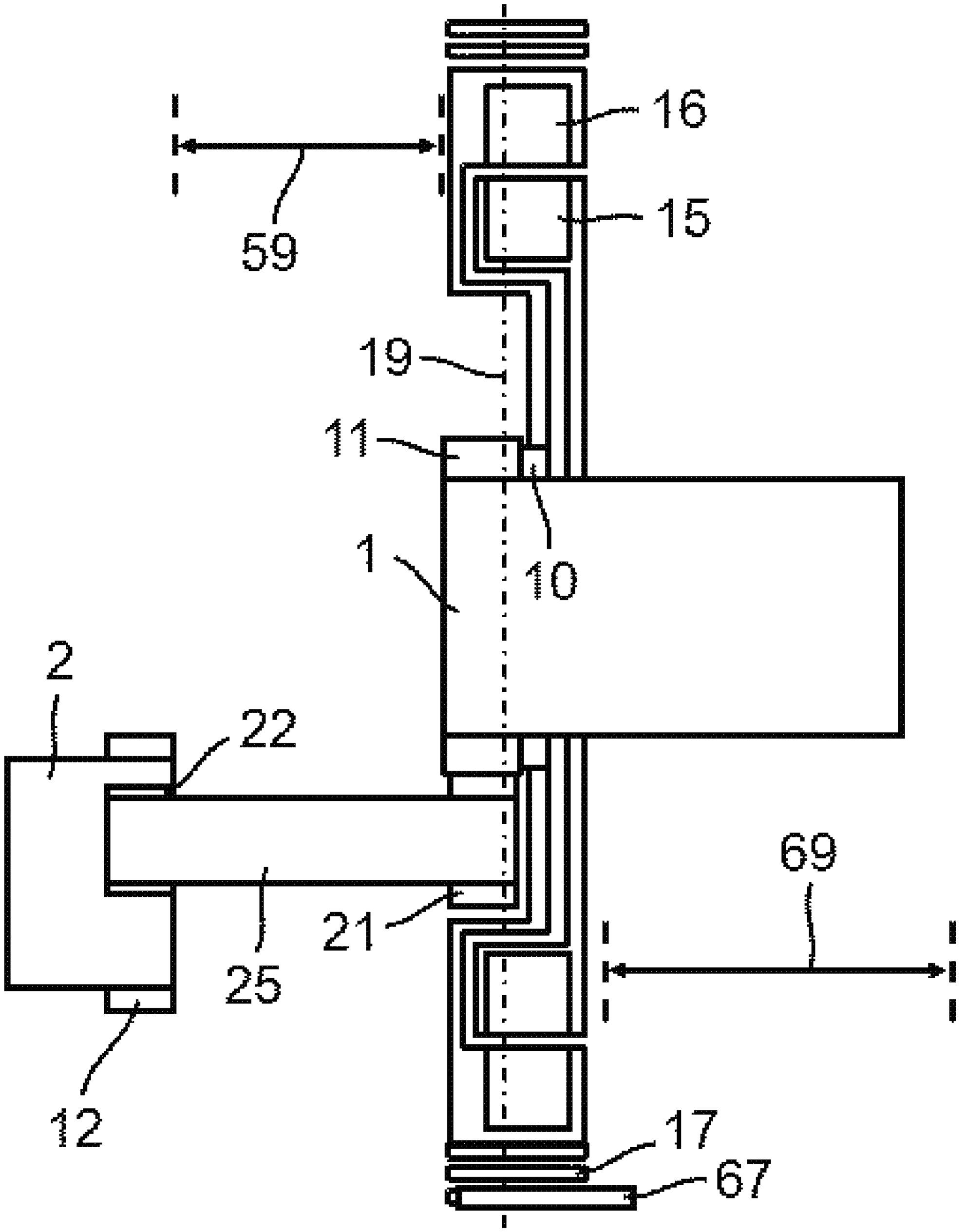

In addition to the apparatus illustrated in FIGS. 1 to 5, FIGS. 34 and 35 illustrate that a rotor 15 is installed on the main journal 1 so as not to idle, a stator 16 is installed on the eccentric sleeve control shaft 10 so as not to idle, one end of a spring 17 is installed on the stator 16 by a fixing device 68 so as not to idle, and the other end of the spring 17 is fixed to the engine block by means of a fixing rod 67. FIG. 34 illustrates a cross-section taken at a position of a cutting line 19 in FIG. 35.

Figure 36:
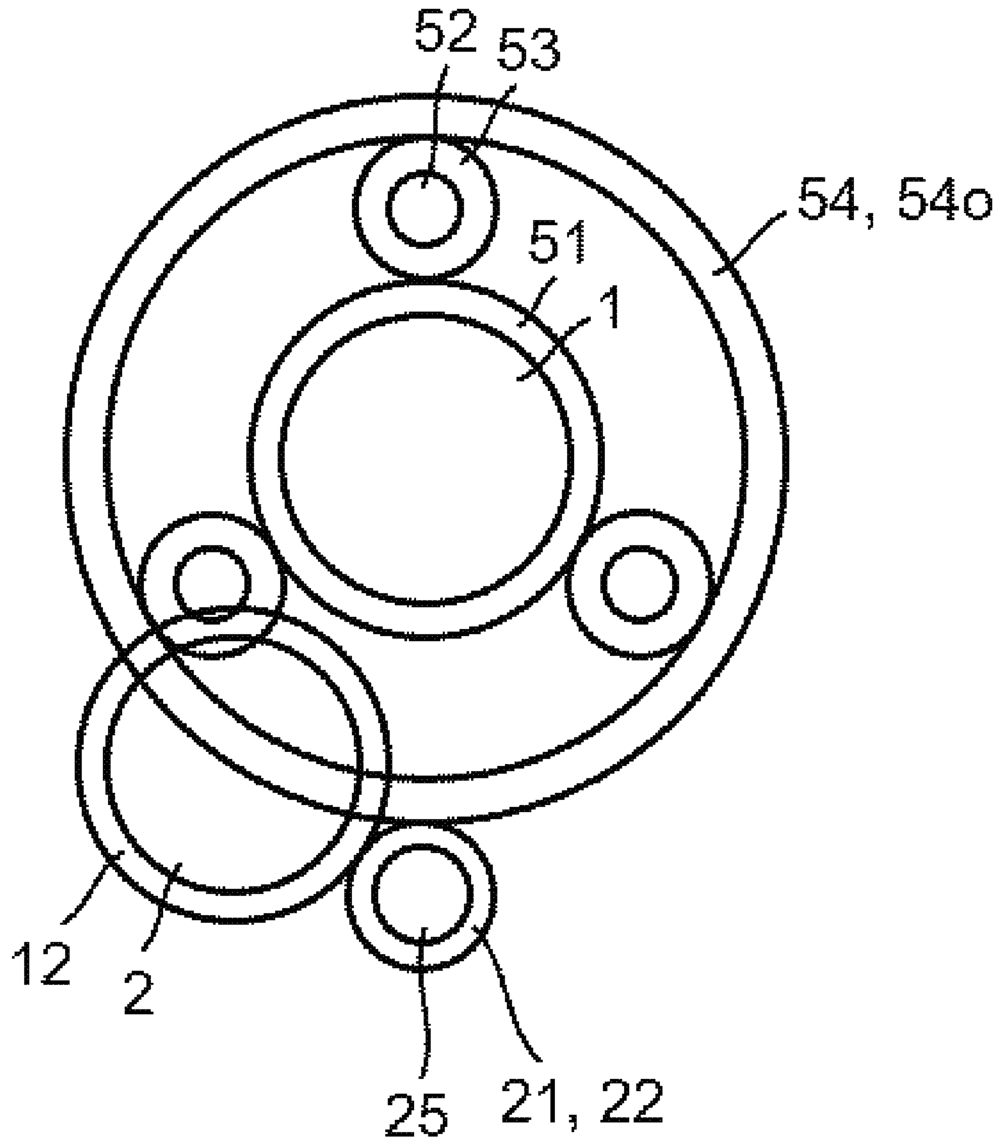
Figure 37:
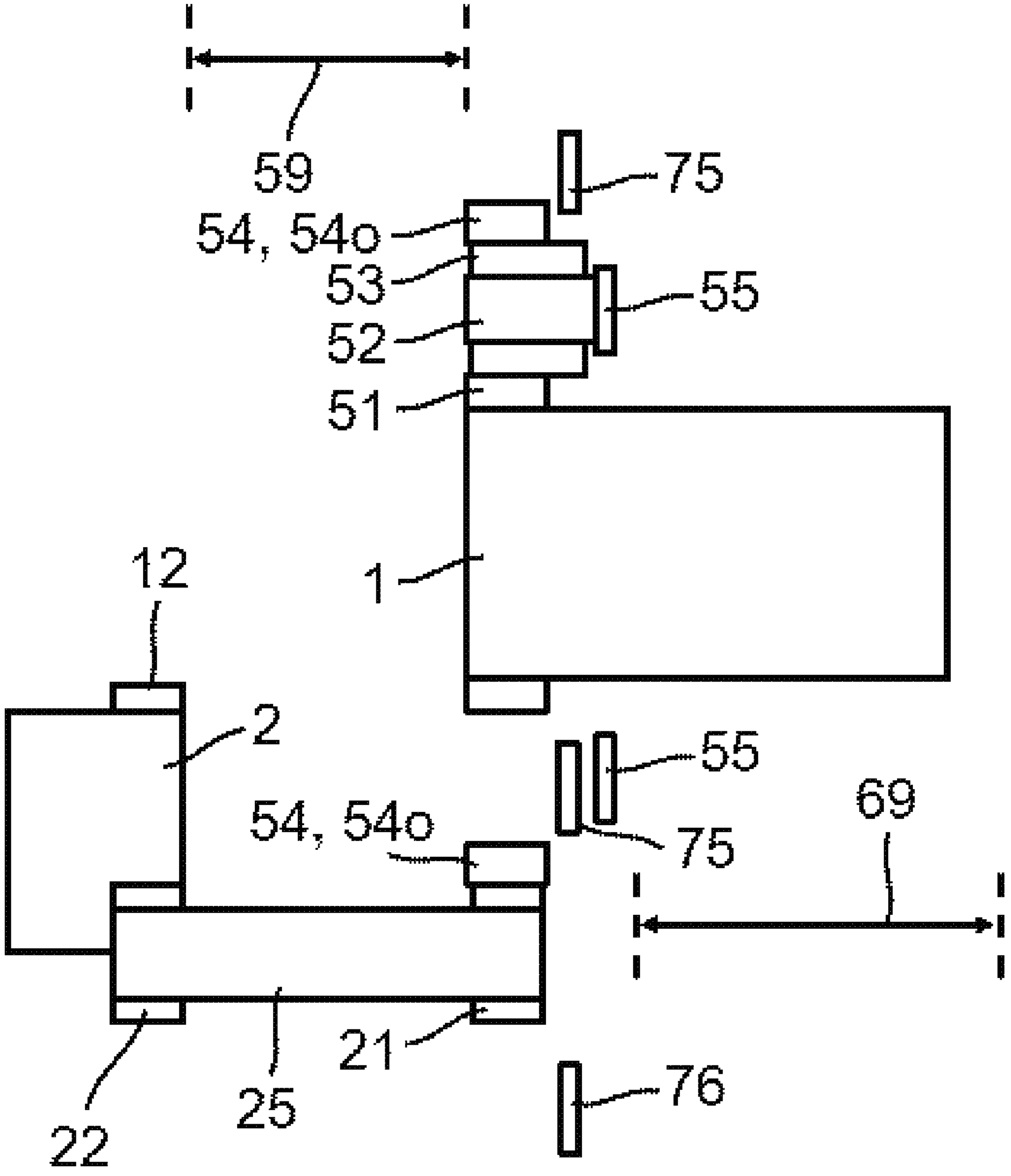
Figure 38:
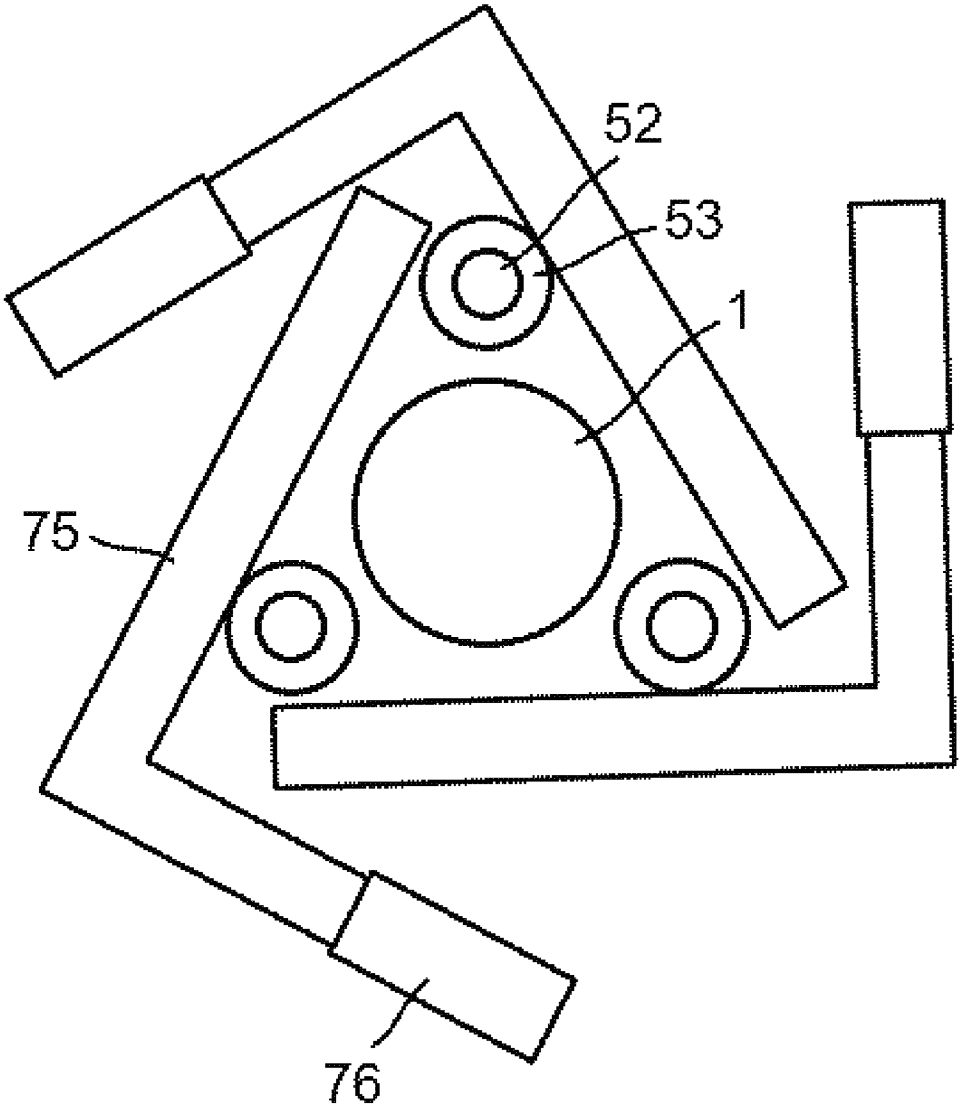

In FIGS. 36 to 38, the sun gear 51 of the first planetary gear system is installed on the main journal 1 so as not to idle, the external ring gear 54*o* is provided outside the ring gear 54, the planetary gear shaft 52 is connected to the carrier 55, a part of the planetary gear 53 engages with the rack of the rack rod 75, and the eccentric sleeve control auxiliary gear 21 engages with the external the ring gear 54*o*.

BEST MODE FOR CARRYING OUT THE INVENTION

The specific contents of the present invention will be described in detail with reference to the embodiment of the present invention illustrated in the accompanying drawings. However, the contents of the present invention are not limited to the contents illustrated in the drawings.

When the eccentric sleeve 13 is used for the crankpin 2, an effective length of a connecting rod may be equal to a distance from a center of a piston pin to a center of an inner circumference of the eccentric sleeve 13 and vary depending on a posture of the eccentric sleeve 13 relative to the center of the piston pin.

In order to change the compression ratio by adjusting the effective length of the connecting rod while using the eccentric sleeve 13 for the crankpin 2, the posture of the eccentric sleeve 13 with respect to the center of the piston pin needs to be constantly maintained even though the main journal 1 rotates. Therefore, the eccentric sleeve 13 does not need to rotate along the main journal 1, and the angle of the eccentric sleeve 13 needs to be manipulated.

FIG. 1 relates to a means capable of changing the compression ratio by adjusting the effective length of the connecting rod by manipulating the posture of the eccentric sleeve 13 installed on the crankpin 2 according to the present invention and illustrates the crankshaft 9, the eccentric sleeve control gear 11 connected to the eccentric sleeve control shaft 10, the eccentric sleeve 13 connected to the eccentric sleeve gear 12, and the eccentric sleeve auxiliary shaft 25 having the two opposite ends at which the eccentric sleeve control auxiliary gear 21 and the eccentric sleeve auxiliary gear 22 are respectively installed so as not to idle. The crankshaft 9 has the main journal 1, the crankpin 2, the crank arms 3 and 4, and the eccentric sleeve auxiliary shaft support bracket 5.

The eccentric sleeve control shaft 10, the eccentric sleeve control gear 11, the eccentric sleeve gear 12, and the eccentric sleeve 13 each have an empty interior. The eccentric sleeve control gear 11 and the eccentric sleeve gear 12 are not specially limited to types of gears or teeth of gears. Only the eccentric sleeve 13 is eccentric, and the eccentric sleeve control shaft 10, the eccentric sleeve control gear 11, and the eccentric sleeve gear 12 are concentric.

The eccentric sleeve control shaft 10 and the eccentric sleeve control gear 11 are installed on the main journal 1 so as to idle, the eccentric sleeve gear 12 and the eccentric sleeve 13 are installed on the crankpin 2 so as to idle, the eccentric sleeve auxiliary shaft 25 is installed on the eccentric sleeve auxiliary shaft support bracket 5 so as to idle, the eccentric sleeve control gear 11 engages with the eccentric sleeve control auxiliary gear 21, and the eccentric sleeve gear 12 engages with the eccentric sleeve auxiliary gear 22.

The crankshaft 9 in FIG. 1 has parts such as a lubricating oil hole, a counter weighter, or a counterweight that are excluded. The sizes or ratios of the main journal 1, the crankpin 2, the right crank arm 3, and the left crank arm 4 are not limited to those in FIG. 1.

The main journal 1 is also called a main bearing journal. The main journal 1 is connected to the engine block and serves to support the crankshaft 9. The crankpin 2 is also called a rod journal, a rod bearing journal, or a connecting rod journal. The crankpin 2 is connected to one connecting rod and serves to convert a reciprocating motion of the piston connected to the connecting rod into a rotational motion of the crankshaft 9. Both the main journal 1 and the crankpin 2 are also called crank journals.

In this case, the crankpin 2 will be referred to as a part connected to one connecting rod. An axial part disposed between the two crank arms 3 and 4, connected to one or more connecting rods, and configured to convert the reciprocating motion of the piston connected to the connecting rod into the rotational motion of the crankshaft 9 will be referred to as a 'rod journal'.

In FIG. 1, in the case of one crankpin 2 between the two crank arms 3 and 4, the rod journal and the crankpin 2 are identical. However, in the case of a V6 engine or a V8 engine, the two crankpins 2 may be provided on one rod journal, and the rod journal and the crankpin may be different.

In case that the two crankpins 2 are provided on one rod journal in the V6 engine, the V8 engine, or the like, the eccentric sleeve auxiliary shaft support bracket 5, the eccentric sleeve control shaft 10, the eccentric sleeve control gear 11, the eccentric sleeve gear 12, the eccentric sleeve 13, the eccentric sleeve control auxiliary gear 21, the eccentric sleeve auxiliary gear 22, and the eccentric sleeve auxiliary shaft 25 may be installed in respect to each of the two crankpins 2. For example in FIG. 1, in case that an additional second crankpin 2 is installed and attached to the right side of the left crank arm 4, an additional second eccentric sleeve auxiliary shaft support bracket 5 may be installed on the left crank arm 4, an additional second eccentric sleeve gear 12 and an additional second eccentric sleeve 13 may be installed on the second crankpin 2, an additional second eccentric sleeve control shaft 10 and an additional second eccentric sleeve control gear 11 may be installed on the main journal 1 provided at the left side of the left crank arm 4, an additional second eccentric sleeve control auxiliary gear 21 and an additional second eccentric sleeve auxiliary gear 22 may be installed at two opposite ends of an additional second eccentric sleeve auxiliary shaft 25, and the second eccentric sleeve auxiliary shaft 25 may be installed on the second eccentric sleeve auxiliary shaft support bracket 5.

FIG. 1 illustrates a method of using one eccentric sleeve auxiliary shaft 25 for one eccentric sleeve 13. However, the present invention is not limited thereto. For example, a third eccentric sleeve auxiliary shaft support bracket 5 may be installed at the rear side of the crank arm 3, a third eccentric sleeve auxiliary shaft 25 on which a third eccentric sleeve control auxiliary gear 21 and a third eccentric sleeve auxiliary gear 22 are respectively installed at two opposite ends so as not to idle may be installed, and the third eccentric sleeve control auxiliary gear 21 and the third eccentric sleeve auxiliary gear 22 may engage with each other at the rear side with respect to the eccentric sleeve control gear 11 and the eccentric sleeve gear 12. With the above-mentioned configuration, when a strong force, which induces a rotation of the eccentric sleeve 13, is applied by a strong impact occurring during an explosion stroke, the eccentric sleeve gear 12 may be supported better than in the previous case by the eccentric sleeve auxiliary gear 22 and the third eccentric sleeve auxiliary gear 22 provided at the two opposite sides of the eccentric sleeve gear 12.

In the description, because there is no separate view illustrating the two crankpins 2, a separate reference numeral or symbol will not be used for the second crankpin 2. Likewise, separate reference numerals or symbols will not be used for the second eccentric sleeve gear 12, the second eccentric sleeve 13, the second eccentric sleeve control shaft 10, the second eccentric sleeve control gear 11, the second eccentric sleeve control auxiliary gear 21, the second eccentric sleeve auxiliary gear 22, the second eccentric sleeve auxiliary shaft 25, the second eccentric sleeve auxiliary shaft support bracket 5, the third eccentric sleeve auxiliary shaft support bracket 5, the third eccentric sleeve control auxiliary gear 21, the third eccentric sleeve auxiliary gear 22, and the third eccentric sleeve auxiliary shaft 25.

The main journal 1 and the crankpin 2 in FIG. 1 may have lubricating oil holes, and main bearings and rod bearings may be used for the main journal 1 and the crankpin 2 and will be referred to as metals.

The eccentric sleeve control shaft 10 and the eccentric sleeve control gear 11 may be installed at a part of one side of the main journal 1 without greatly affecting the main bearing.

In order to install the crankpin 2 between the eccentric sleeve gear 12 and the eccentric sleeve 13, lubrication needs to be considered between the crankpin 2 and the eccentric sleeve 13 and between the eccentric sleeve 13 and the large hole of the big end of the connecting rod. The rod bearings may be installed at the two locations. The rod bearing may be installed at one location at which a slip often occurs. The eccentric sleeve 13 may also be configured to serve as the rod bearing.

FIG. 2 illustrates in detail that the eccentric sleeve control gear 11 and the eccentric sleeve control auxiliary gear 21 engage with each other, and the eccentric sleeve gear 12 and the eccentric sleeve auxiliary gear 22 engage with each other.

The crankpin 2, the eccentric sleeve gear 12, the eccentric sleeve 13, the eccentric sleeve control auxiliary gear 21, the eccentric sleeve auxiliary gear 22, and the eccentric sleeve auxiliary shaft 25 revolve around a rotation axis, i.e., a center of the main journal 1. During this process, the eccentric sleeve control auxiliary gear 21 is kept engaging with the eccentric sleeve control gear 11, and the eccentric sleeve auxiliary gear 22 is kept engaging with the eccentric sleeve gear 12.

A diameter of the eccentric sleeve control gear 11 and a diameter of the eccentric sleeve gear 12 may be different from each other. A ratio between a pitch circle diameter of the eccentric sleeve control gear 11 and a pitch circle diameter of the eccentric sleeve control auxiliary gear 21 needs to be consistent with a ratio between a pitch circle diameter of the eccentric sleeve gear 12 and a pitch circle diameter of the eccentric sleeve auxiliary gear 22.

In FIG. 2, it can be seen that the pitch circle diameter of the eccentric sleeve control gear 11 is two times larger than the pitch circle diameter of the eccentric sleeve control auxiliary gear 21, and the pitch circle diameter of the eccentric sleeve gear 12 is two times larger than the pitch circle diameter of the eccentric sleeve auxiliary gear 22.

In FIG. 2, when a situation in which the eccentric sleeve control gear 11 is stopped with no rotation and the main journal 1 is rotated is assumed, the crankpin 2, the eccentric sleeve gear 12, the eccentric sleeve 13, the eccentric sleeve control auxiliary gear 21, the eccentric sleeve auxiliary gear 22, and the eccentric sleeve auxiliary shaft 25 revolve around the main journal 1, and the eccentric sleeve control auxiliary gear 21 engages with the eccentric sleeve control gear 11 and rotates while simultaneously revolving around the eccentric sleeve control gear 11. In this case, the revolution and rotation directions of the eccentric sleeve control auxiliary gear 21 are identical to the rotation direction of the main journal 1.

Therefore, like the eccentric sleeve control auxiliary gear 21, the eccentric sleeve auxiliary gear 22 also rotates while simultaneously revolving, and the eccentric sleeve gear 12 engaging with the eccentric sleeve auxiliary gear 22 also rotates while simultaneously revolving. In this case, the revolution direction of the eccentric sleeve gear 12 is identical to the revolution direction of the eccentric sleeve auxiliary gear 22, and the rotation direction is opposite to the rotation direction of the eccentric sleeve auxiliary gear 22.

The rotation of the eccentric sleeve gear 12, which occurs as described above, cancels one rotation that occurs when the crankpin 2 performs one revolution around the main journal 1, such that the eccentric sleeve gear 12 only revolves with no rotation.

According to the assumption and the result thereof, it can be seen that the eccentric sleeve gear 12 revolves without rotating in the situation in which the eccentric sleeve control gear 11 is stopped with no rotation and the main journal 1 rotates, such that the eccentric sleeve control gear 11 and the eccentric sleeve gear 12 are provided in the same posture.

In addition, in FIG. 2, when a situation in which the eccentric sleeve control shaft 10 and the eccentric sleeve control gear 11 rotate at predetermined angles in the state in which the main journal 1 is stopped with no rotation is assumed, the eccentric sleeve gear 12 does not revolve because the crankpin 2 is stopped, and the eccentric sleeve control auxiliary gear 21 engaging with the eccentric sleeve control gear 11 rotates in a direction opposite to the eccentric sleeve control gear 11. When the eccentric sleeve auxiliary gear 22 rotates in accordance with the rotation of the eccentric sleeve control auxiliary gear 21, the eccentric sleeve gear 12 engaging with the eccentric sleeve auxiliary gear 22 rotates. The rotation direction of the eccentric sleeve gear 12 is opposite to the rotation direction of the eccentric sleeve auxiliary gear 22 and identical to the rotation direction of the eccentric sleeve control gear 11. A rotation angle of the eccentric sleeve gear 12 is identical to a rotation angle of the eccentric sleeve control gear 11.

According to the assumption and the result thereof, it can be seen that the eccentric sleeve gear 12 is provided with no revolution in the state in which the main journal 1 is stopped, and the eccentric sleeve gear 12 rotates at an angle identical to an angle at which the eccentric sleeve control gear 11 rotates, such that the eccentric sleeve control gear 11 and the eccentric sleeve gear 12 are provided in the same posture.

According to the two assumptions and the results thereof, it can be seen that when the eccentric sleeve control gear 11 rotates at a particular angle regardless of the rotation of the main journal 1, the eccentric sleeve gear 12 also rotates at the same angle, and the posture thereof is maintained. When the posture of the eccentric sleeve control shaft 10 is adjusted by rotating the eccentric sleeve control shaft 10, the eccentric sleeve 13 also rotates and is adjusted to the same posture.

In FIG. 2, in case that the eccentric sleeve control auxiliary gear 21 performs one revolution around the eccentric sleeve control gear 11 and returns to an original place as the main journal 1 performs one rotation in the state in which the eccentric sleeve control gear 11 is stopped with no rotation, the eccentric sleeve control auxiliary gear 21 performs three rotations. Among the three rotations, one rotation is generated by the revolution of the eccentric sleeve control auxiliary gear 21, and the two rotations are generated as the pitch circle diameter of the eccentric sleeve control gear 11 is two times larger than the pitch circle diameter of the eccentric sleeve control auxiliary gear 21. The rotation direction is identical to the revolution direction.

FIG. 3 illustrates the positions of the crankpin 2 and the eccentric sleeve auxiliary shaft 25 when the main journal 1 rotates by half a turn and the eccentric sleeve control gear 11 does not rotate in the state in FIG. 2. The eccentric sleeve 13 revolves by half a turn without rotating. It can be seen that the posture of the eccentric sleeve 13 is not changed.

In FIG. 2, when the eccentric sleeve control auxiliary gear 21 performs three rotations while performing one revolution around the rotation center, i.e., the center of the main journal 1 as the main journal 1 performs one rotation while not rotating the eccentric sleeve control gear 11, the eccentric sleeve auxiliary gear 22 performs three rotations while performing one revolution and returns to the original place. Therefore, the eccentric sleeve gear 12 engaging with the eccentric sleeve auxiliary gear 22 also performs one revolution around the main journal 1 in accordance with the rotation of the main journal 1 and returns to the original place but does not perform the rotation. The reason why the rotation is not performed is that one rotation, which occurs while the eccentric sleeve gear 12 performs the revolution, occurs in the same direction as the revolution, but the rotation is cancelled by the two rotations, except for one rotation caused by the revolution, among the three rotations in the same direction of the eccentric sleeve auxiliary gear 22 engaging with the eccentric sleeve gear 12. The reason why the one rotation caused by the revolution is excluded is that the eccentric sleeve gear 12 and the eccentric sleeve auxiliary gear 22 engage with each other and perform one revolution. If the eccentric sleeve auxiliary gear 22 only performs one rotation in accordance with one revolution, the eccentric sleeve gear 12 also performs one revolution and one rotation. Because the eccentric sleeve auxiliary gear 22 further performs two rotations, the eccentric sleeve gear 12 performs one rotation in the opposite direction, such that the eccentric sleeve gear 12 performs no rotation.

Therefore, it can be seen that when the main journal 1 rotates with no rotation of the eccentric sleeve control gear 11, the eccentric sleeve gear 12 also does not rotate, such that the eccentric sleeve control gear 11 and the eccentric sleeve gear 12 are kept in the same posture.

In FIG. 2, when the eccentric sleeve control gear 11 rotates at a predetermined angle in the state in which the main journal 1 is stopped with no rotation, the eccentric sleeve control auxiliary gear 21, the eccentric sleeve auxiliary shaft 25, and the eccentric sleeve auxiliary gear 22 transmit the rotation, and the eccentric sleeve gear 12 rotates, such that the rotation angle of the eccentric sleeve gear 12 is equal to the rotation angle of the eccentric sleeve control gear 11.

According to the two cases, it can be seen that when the eccentric sleeve control gear 11 and the eccentric sleeve gear 12 are kept in the same posture and the eccentric sleeve control gear 11 rotates at a predetermined angle regardless of the rotation of the main journal 1, the eccentric sleeve gear 12 also rotates at the same angle, such that the eccentric sleeve control gear 11 and the eccentric sleeve gear 12 are always kept in the same posture.

In order to more easily understand the process in which the eccentric sleeve gear 12 revolves with no rotation as another method, it can be envisioned in FIG. 2 that the eccentric sleeve auxiliary gear 22 performs one revolution and three rotations around the eccentric sleeve gear 12 in the state in which the eccentric sleeve gear 12 is fixed without rotating. In this case, the eccentric sleeve auxiliary gear 22 returns to its own place by performing one revolution and three rotations around the eccentric sleeve gear 12. In this process, the state in which the eccentric sleeve gear 12 performs one revolution around the eccentric sleeve auxiliary gear 22 with no rotation is recognized well when a center of a coordinate system changes from a center of the eccentric sleeve gear 12 to a center of the eccentric sleeve auxiliary gear 22 or in the situation in which the eccentric sleeve auxiliary gear 22 rotates in place and the eccentric sleeve gear 12 performs one revolution with no rotation about the eccentric sleeve auxiliary gear 22. Next, the state in which the eccentric sleeve gear 12 performs one revolution around the eccentric sleeve control gear 11 with no rotation in the state in which the eccentric sleeve gear 12 is kept engaging with the eccentric sleeve auxiliary gear 22 is recognized well when the center of the coordinate system changes to the center of the eccentric sleeve control gear 11.

It is important to note from the above-mentioned description that when the eccentric sleeve control gear 11 is in a fixed state without rotating, the eccentric sleeve gear 12 does not perform the rotation even though the eccentric sleeve gear 12 performs the revolution.

Therefore, it can be seen that the eccentric sleeve control shaft 10, the eccentric sleeve control gear 11, the eccentric sleeve gear 12, and the eccentric sleeve 13 are kept in the same posture regardless of the rotation of the main journal 1.

In addition, it can be seen that when the eccentric sleeve control shaft 10 rotates at a predetermined angle regardless of the rotation of the main journal 1, the eccentric sleeve control gear 11, the eccentric sleeve gear 12, and the eccentric sleeve 13 rotate at the same angle.

Therefore, it is possible to control the posture of the eccentric sleeve 13 by adjusting the eccentric sleeve control shaft 10 regardless of the rotation of the main journal 1.

When the posture of the eccentric sleeve control shaft 10 is fixed, the posture of the eccentric sleeve 13 is also fixed. When the posture of the eccentric sleeve 13 is fixed, the posture of the eccentric sleeve 13 relative to the connecting rod at the top dead center is fixed, an effective length of the connecting rod is also fixed, and the top dead center and the bottom dead center of the piston are fixed, such that a constant compression ratio is maintained. In this case, when the posture of the eccentric sleeve control shaft 10 is changed, the posture of the eccentric sleeve 13 is also changed. When the posture of the eccentric sleeve 13 is changed, the posture of the eccentric sleeve 13 relative to the connecting rod at the top dead center is changed, the effective length of the connecting rod is also changed, the positions of the top dead center and the bottom dead center of the piston are moved in the same direction, such that the compression ratio is changed. The stroke and the amount of exhaust gas are not changed, but the time points of the top dead center and the bottom dead center may be changed. A valve timing adjustment method and an ignition timing adjustment method may be used together.

There may be various methods of controlling the eccentric sleeve control shaft 10. For example, a gear may be installed on the eccentric sleeve control shaft 10 and engage with a gear connected to a control motor. A worm gear and a worm may be used. An operation of fixing one end of the rod to the eccentric sleeve control shaft 10 and rotating the other end of the rod may be controlled. A pinion and a rack may be used, or a sprocket, a chain, and the like may be used.

In FIGS. 1 to 3, the gears, such as the eccentric sleeve control gear 11, the eccentric sleeve control auxiliary gear 21, the eccentric sleeve auxiliary gear 22, and the eccentric sleeve gear 12, are used to connect the eccentric sleeve control shaft 10, the eccentric sleeve auxiliary shaft 25, and the eccentric sleeve 13. However, the connection is not limited to the gears. The connection may be implemented by using a timing pulley and a timing belt or using a sprocket and a timing chain. Any one of the method of using the timing belt and the method of using the timing chain may be freely used, but only one of the two methods need not be used. The method cannot be interchangeable with the method of using the gears. This is because the rotation direction of the shaft is affected.

Figure 4:
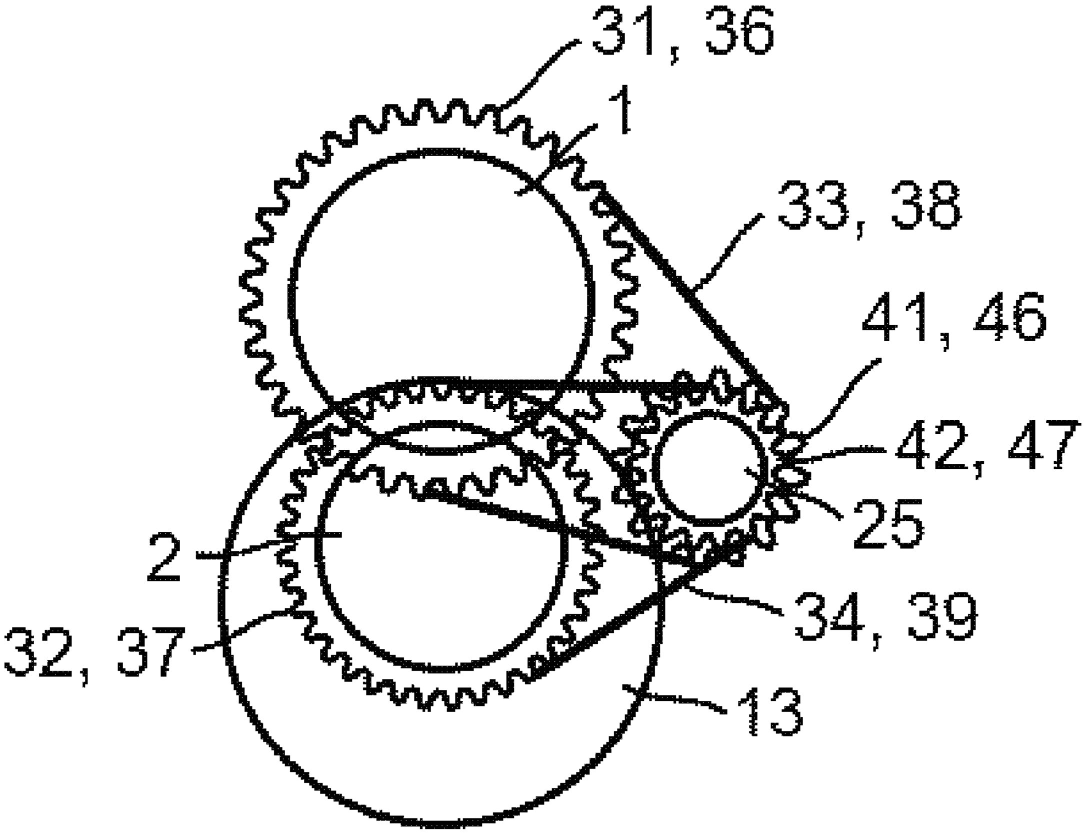
FIG. 4 illustrates all components that may be visible when the configurations in FIGS. 1 to 3 are partially changed.

FIG. 4 illustrates that in FIGS. 1 to 3, the eccentric sleeve control gear 11 changes to the eccentric sleeve control timing pulley 31, the eccentric sleeve control auxiliary gear 21 changes to the eccentric sleeve control auxiliary timing pulley 41, the eccentric sleeve control timing pulley 31 and the eccentric sleeve control auxiliary timing pulley 41 are connected by using the first timing belt 33, the eccentric sleeve gear 12 changes to the eccentric sleeve timing pulley 32, the eccentric sleeve auxiliary gear 22 changes to the eccentric sleeve auxiliary timing pulley 42, the eccentric sleeve timing pulley 32 and the eccentric sleeve auxiliary timing pulley 42 are connected by using the second timing belt 34, the eccentric sleeve control gear 11 changes to the eccentric sleeve control sprocket 36, the eccentric sleeve control auxiliary gear 21 changes to the eccentric sleeve control auxiliary sprocket 46, the eccentric sleeve control sprocket 36 and the eccentric sleeve control auxiliary sprocket 46 are connected by using the first timing chain 38, the eccentric sleeve gear 12 changes to the eccentric sleeve sprocket 37, the eccentric sleeve auxiliary gear 22 changes to the eccentric sleeve auxiliary sprocket 47, and the eccentric sleeve sprocket 37 and the eccentric sleeve auxiliary sprocket 47 are connected by using the second timing chain 39.

Figure 5:
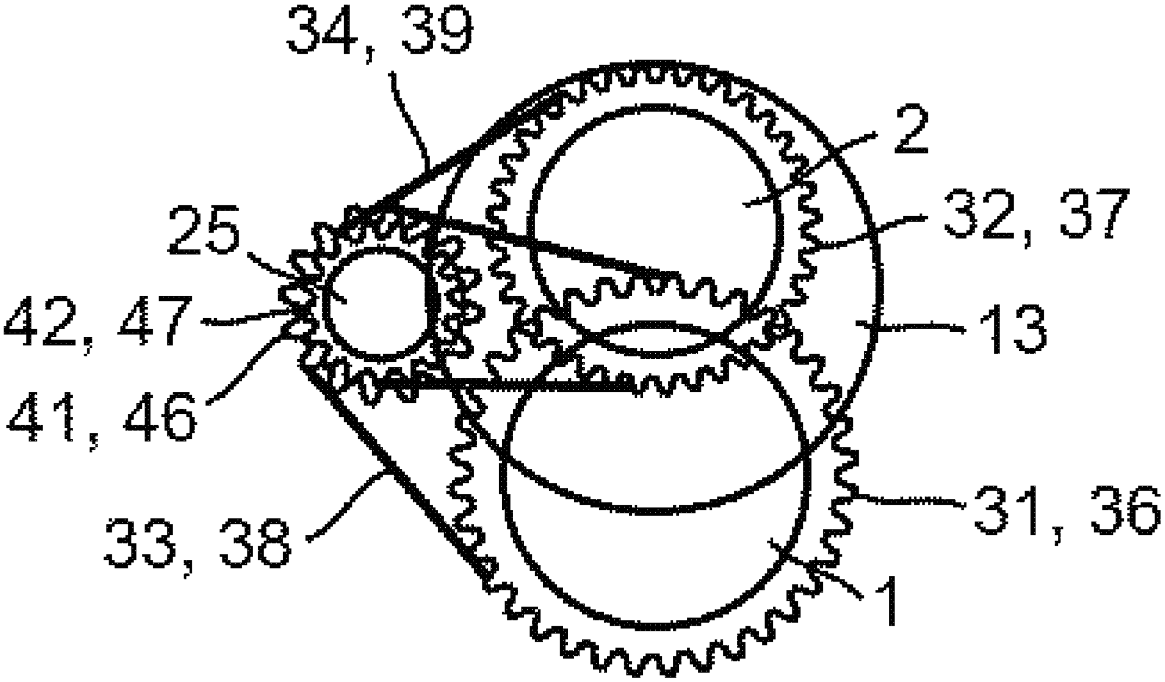
FIG. 5 illustrates changes in positions of the crankpin 2 and the eccentric sleeve auxiliary shaft 25 in case that the main journal 1 is rotated by half a turn from the state in FIG. 4 and the eccentric sleeve control timing pulley 31 and the eccentric sleeve control sprocket 36 are not rotated. It can be seen that the posture of the eccentric sleeve 13 is not changed.

FIG. 5 illustrates changes in positions of the crankpin 2 and the eccentric sleeve auxiliary shaft 25 in case that the main journal 1 is rotated by half a turn from the state in FIG. 4 and the eccentric sleeve control timing pulley 31 and the eccentric sleeve control sprocket 36 are not rotated. It can be seen that the posture is not changed because the eccentric sleeve 13 revolves by half a turn revolution but does not rotate.

When the eccentric sleeve 13 is used for the crankpin 2, an effective length of the crank arm may be equal to a distance from a center of the main journal 1 to a center of an outer circumference of the eccentric sleeve 13 and vary depending on a posture of the eccentric sleeve 13 relative to the center of the main journal 1.

In order to change the compression ratio by adjusting the effective length of the crank arm while using the eccentric sleeve 13 for the crankpin 2, the posture of the eccentric sleeve 13 relative to the center of the main journal 1 needs to be constantly maintained even though the main journal 1 rotates. Therefore, the eccentric sleeve 13 needs to rotate together with the main journal 1, and the eccentric sleeve 13 needs to be advanced or retracted.

FIGS. 6 to 31 are views related to a means capable of changing the compression ratio by changing the effective length of the crank arm by manipulating the posture of the eccentric sleeve 13 installed on the crankpin 2 according to the present invention. In this case, the eccentric sleeve control shaft 10 and the eccentric sleeve control gear 11 of the apparatus illustrated in FIGS. 1 to 3 are not used, and two planetary gear systems are used instead. A first planetary gear system rotates the eccentric sleeve 13 by means of the eccentric sleeve auxiliary shaft 25 and gears, and the second planetary gear system operates the first planetary gear system.

The relative positions and distances of the crankpin 2 and the eccentric sleeve auxiliary shaft 25 with respect to the main journal 1 illustrated in FIGS. 6 to 31 are not limited to those illustrated in the drawings. The length of the crank arm 3 is not limited to that illustrated in the drawings.

The configuration in which the number of planetary gears of each of the planetary gear systems in the example illustrated in FIGS. 6 to 28 is three is an example, and the diameters of the gears are examples. However, the present invention is not limited thereto. The method of configuring the planetary gear system is an example, and the present invention is not limited thereto.

The planetary gear system illustrated in FIGS. 6 to 28 is a usage example, but the present invention is not limited thereto. The sun timing pulley 51*p* or the sun sprocket 51*s* may be connected to the sun gear 51, the external ring gear 54*o*, the external ring timing pulley 54*p*, and the external ring sprocket 54*s* may be installed outside the ring gear 54, and the carrier gear 58 may change to the carrier timing pulley 58*p* or the carrier sprocket 58*s*. After the connection, installation, or change, the gears may be appropriately connected by engaging with each other or using a belt, a chain, or the like.

FIGS. 6, 7, and 9 to 28 illustrate a planetary gear system in which one eccentric sleeve gear 12 is connected to one crankpin 2. However, in case that one rod journal has the two crankpins 2, there may be a planetary gear system in which the eccentric sleeve gears 12 are respectively provided on the crankpins 2, and the eccentric sleeve gears 12 are each connected to the main journal 1 at a lateral side of the crankpin 2.

FIGS. 6, 7, and 9 to 28 illustrate the method of using one eccentric sleeve auxiliary shaft 25 for one eccentric sleeve 13. However, the present invention is not limited thereto. As described above, the third eccentric sleeve auxiliary shaft 25 on which the third eccentric sleeve control auxiliary gear 21 and the third eccentric sleeve auxiliary gear 22 are installed is installed on the third eccentric sleeve auxiliary shaft support bracket 5, the third eccentric sleeve control auxiliary gear 21 engages with a rotation output gear of the first planetary gear system, the third eccentric sleeve auxiliary gear 22 engages with the eccentric sleeve gear 12, such that the eccentric sleeve gear 12 may be better supported.

In FIGS. 6 to 28, in order to rotate the eccentric sleeve 13 together with the main journal 1, the eccentric sleeve gear 12 needs to perform one revolution and one rotation in accordance with one revolution when the main journal 1 performs one rotation. Therefore, the eccentric sleeve auxiliary gear 22 engaging with the eccentric sleeve gear 12 and the eccentric sleeve control auxiliary gear 21 connected to the eccentric sleeve auxiliary gear 22 need to perform one revolution and one rotation. When the eccentric sleeve control auxiliary gear 21 performs one revolution and one rotation, any one gear of the planetary gear system engaging with the eccentric sleeve control auxiliary gear 21 needs to perform one rotation. In other words, when any one gear of the planetary gear system engaging with the eccentric sleeve control auxiliary gear 21 rotates together with the main journal 1, the eccentric sleeve 13 rotates together with the main journal 1. When any one gear rotates differently from the main journal 1, the eccentric sleeve 13 does not rotate together with the main journal 1.

In the description of the following example, the components included in the first planetary gear system between the first planetary gear system and the second planetary gear system are not denoted by the term 'first' in front of the names of the components, but the components are described as the sun gear 51, the planetary gear shaft 52, the planetary gear 53, the ring gear 54, the carrier 55, and the like. That is, the components are not denoted, like 'first sun gear 51'. The components included in the second planetary gear system are denoted by the term 'second', like 'second sun gear 61', in front of the names of the components.

In FIGS. 6 and 7, the sun gear 51 is installed on the main journal 1 so as to idle, the carrier 55 is integrated with the second carrier 65 and configured to idle relative to the main journal 1, and the eccentric sleeve control auxiliary gear 21 engages with the sun gear 51. The advancement and retraction control may be performed by the ring gear 54.

The second sun gear 61 is installed on the main journal 1 so as not to idle, and the second ring gear 64 is fixed to the engine block by means of the fixing rod 67.

When the diameter of the sun gear 51 is 10, the diameter of the planetary gear 53 is 4, the diameter of the ring gear 54 is 18, and the ring gear 54 is stopped, the sun gear 51 rotates by 2.8 turns when the carrier 55 rotates by 1 turn.

The diameter of the second sun gear 61, the diameter of the second planetary gear 63, and the diameter of the second ring gear 64 are respectively identical to the diameter of the sun gear 51, the diameter of the planetary gear 53, and the diameter of the ring gear 54. The second ring gear 64 does not rotate.

Because the second sun gear 61 is installed on the main journal 1 so as not to idle, the second sun gear 61 rotates at the same speed as the main journal 1. The carrier 55 rotates by 1/2.8 turn when the second sun gear 61 rotates by 1 turn.

Therefore, it can be seen that when the main journal 1 and the second sun gear 61 rotate by 1 turn, the sun gear 51 also rotates by 1 turn.

As the main journal 1 and the sun gear 51 rotate together, the eccentric sleeve control auxiliary gear 21 engaging with the sun gear 51 may rotate together with the main journal 1, and the eccentric sleeve auxiliary gear 22, the eccentric sleeve gear 12, and the eccentric sleeve 13 also rotate together with the main journal 1. That is, the eccentric sleeve 13 is kept in the same posture with respect to the center of the main journal 1, and the posture relative to the center of the main journal 1 is not changed.

In this case, when the ring gear 54 rotates, the rotation may advance or retract the sun gear 51 by means of the planetary gear 53, such that the posture of the eccentric sleeve 13 relative to the center of the main journal 1 may be manipulated, and the effective length of the crank arm 3 may be adjusted.

When the effective length of the crank arm 3 is adjusted, the positions of the top dead center and the bottom dead center of the piston are moved in the opposite directions, such that the compression ratio is changed. The stroke and the amount of exhaust gas are also changed, and the time points of the top dead center and the bottom dead center are also changed. A valve timing adjustment method and an ignition timing adjustment method may be used together.

FIG. 8 illustrates a difference in which the apparatus illustrated in FIGS. 6 and 7 operates in a different way from the apparatus illustrated in FIGS. 1 to 3. The same may also apply to FIGS. 6, 7, 9 to 12, and 17 to 24.

FIG. 8 illustrates a connection relationship between the gears including the changed positions of the crankpin 2 and the eccentric sleeve auxiliary shaft 25 in case that the main journal 1 rotates by half a turn and the sun gear 51 rotates by half a turn together with the main journal 1 in the state in which the crankpin 2 is positioned below the main journal 1 first in the apparatus illustrated in FIGS. 6 and 7 as illustrated in FIG. 2. FIG. 8 is also applied to the apparatus illustrated in FIGS. 9, 10, 21, and 22. Both the case in which the external ring gear 54*o* in FIGS. 17 to 20 rotates by half a turn together with the main journal 1 and the case in which the carrier gear 58 in FIGS. 11, 12, 23, and 24 rotates by half a turn together with the main journal 1 are illustrated.

FIG. 3 illustrates that even though the main journal 1 of the apparatus illustrated in FIG. 1 rotates by half a turn, the eccentric sleeve 13 revolves by half a turn without rotating, such that the posture is not changed. FIG. 8 illustrates that when the main journal 1 rotates by half a turn, the eccentric sleeve 13 revolves by half a turn and rotates by half a turn.

FIG. 8 illustrates that the main journal 1 rotates by half a turn in the state in which the crankpin 2 is provided below the main journal 1 first as illustrated in FIG. 2. It can be seen that the positions of the crankpin 2 and the eccentric sleeve auxiliary shaft 25 are changed as illustrated in FIG. 3. However, it can be seen that the sun gear 51, the external ring gear 54*o*, and the carrier gear 58 rotate by half a turn together with the main journal 1, the eccentric sleeve 13 revolves by half a turn and rotates by half a turn, and the posture is changed, unlike in FIG. 3.

In FIGS. 9 and 10, the sun gear 51 is installed on the main journal 1 so as to idle, and the eccentric sleeve control auxiliary gear 21 engages with the sun gear 51. The advancement and retraction control may be performed by the carrier 55.

The second sun gear 61 is installed on the main journal 1 so as not to idle, the second carrier 65 is fixed to the engine block by means of the fixing rod 67, and the second ring gear 64 is connected to the ring gear 54.

When the diameter of the sun gear 51 is 10.3, the diameter of the planetary gear 53 is 4, the diameter of the ring gear 54 is 18.3, and the carrier 55 is stopped, the sun gear 51 rotates by −1.78 turns when the ring gear 54 rotates by 1 turn.

The diameter of the second sun gear 61 is 10, the diameter of the second planetary gear 63 is 4, the diameter of the second ring gear 64 is 18, and the second carrier 65 does not rotate.

The second sun gear 61 rotates at the same speed as the main journal 1. The second ring gear 64 rotates by −0.56 turn when the second sun gear 61 rotates by 1 turn.

Therefore, it can be seen that when the main journal 1 and the second sun gear 61 rotate by 1 turn, the sun gear 51 also rotates by 1 turn That is, the main journal 1 and the sun gear 51 rotate together.

In this case, when the carrier 55 rotates, the effective length of the crank arm 3 is adjusted, such that the compression ratio, the stroke, and the amount of exhaust gas are changed.

In FIGS. 11 and 12, the sun gear 51 is installed on the main journal 1 so as to idle, the carrier 55 is connected to a carrier gear 58, and the eccentric sleeve control auxiliary gear 21 engages with the carrier gear 58. The advancement and retraction control may be performed by the ring gear 54.

The second sun gear 61 is installed on the main journal 1 so as to idle, the second sun gear 61 is connected to the sun gear 51, the second carrier 65 is installed on the main journal 1 so as not to idle, and the second ring gear 64 is fixed to the engine block by means of the fixing rod 67.

When the diameter of the sun gear 51 is 10, the diameter of the planetary gear 53 is 4, the diameter of the ring gear 54 is 18, and the ring gear 54 is stopped, the carrier gear 58 rotates by 0.357 turn when the sun gear 51 rotates by 1 turn.

The diameter of the second sun gear 61 is 10, the diameter of the second planetary gear 63 is 4, the diameter of the second ring gear 64 is 18, and the second ring gear 64 does not rotate.

The second carrier 65 rotates at the same speed as the main journal 1. The second sun gear 61 rotates by 2.8 turns when the second carrier 65 rotates by 1 turn.

Therefore, it can be seen that when the main journal 1 and the second carrier 65 rotate by 1 turn, the carrier gear 58 also rotates by 1 turn. That is, the main journal 1 and the carrier gear 58 rotate together.

In this case, when the ring gear 54 rotates, the effective length of the crank arm 3 is adjusted, such that the compression ratio, the stroke, and the amount of exhaust gas are changed.

In FIGS. 13 and 14, the sun gear 51 is installed on the main journal 1 so as to idle, and the eccentric sleeve control auxiliary gear 21 engages with the ring gear 54. The advancement and retraction control may be performed by the carrier 55.

The second sun gear 61 is installed on the main journal 1 so as to idle, the second sun gear 61 is connected to the sun gear 51, the second carrier 65 is fixed to the engine block by means of the fixing rod 67, the second ring gear 64 is connected to the second gear disk 66, and a second gear disk 66 is installed on the main journal 1 so as not to idle.

When the diameter of the sun gear 51 is 10, the diameter of the planetary gear 53 is 4, the diameter of the ring gear 54 is 18, and the carrier 54 is stopped, the ring gear 54 rotates by −0.56 turn when the sun gear 51 rotates by 1 turn.

The diameter of the second sun gear 61 is 10, the diameter of the second planetary gear 63 is 4, the diameter of the second ring gear 64 is 18, and the second planetary gear shaft 62 does not rotate.

The second ring gear 64 rotates at the same speed as the main journal 1. The second sun gear 61 rotates by −1.8 turns when the second ring gear 64 rotates by 1 turn.

Therefore, it can be seen that when the main journal 1 and the second ring gear 64 rotate by 1 turn, the ring gear 54 rotates by 1 turn. That is, the main journal 1 and the ring gear 54 rotate together.

In this case, when the carrier 55 rotates, the effective length of the crank arm 3 is adjusted, such that the compression ratio, the stroke, and the amount of exhaust gas are changed.

In FIGS. 15 and 16, the sun gear 51 is connected to the second sun gear 61 by means of the gear disk 56, and the eccentric sleeve control auxiliary gear 21 engages with the ring gear 54. The advancement and retraction control may be performed by the carrier 55.

The second sun gear 61 is installed on the main journal 1 so as to idle, the second carrier 65 is fixed to the engine block by means of the fixing rod 67, the second ring gear 64 is connected to the second gear disk 66, and the second gear disk 66 is fixed to the main journal 1 so as not to idle.

When the diameter of the sun gear 51 is 20, the diameter of the planetary gear 53 is 8, the diameter of the ring gear 54 is 36, and the carrier 54 is stopped, the ring gear 54 rotates by −0.56 turn when the sun gear 51 rotates by 1 turn.

The diameter of the second sun gear 61 is 10, the diameter of the second planetary gear 63 is 4, the diameter of the second ring gear 64 is 18, and the second carrier 65 does not rotate.

The second ring gear 64 rotates at the same speed as the main journal 1. The second sun gear 61 rotates by −1.8 turns when the second ring gear 64 rotates by 1 turn.

Therefore, it can be seen that when the main journal 1 and the second ring gear 64 rotate by 1 turn, the ring gear 54 rotates by 1 turn. That is, the main journal 1 and the ring gear 54 rotate together.

In this case, when the carrier 55 rotates, the effective length of the crank arm 3 is adjusted, such that the compression ratio, the stroke, and the amount of exhaust gas are changed.

In FIGS. 17 and 18, the sun gear 51 is integrated with the second ring gear 64, the external ring gear 54*o* is provided outside the ring gear 54, and the eccentric sleeve control auxiliary gear 21 engages with the external ring gear 54*o*. The advancement and retraction control may be performed by the carrier 55.

The second sun gear 61 is installed on the main journal 1 so as to idle, the second sun gear 61 is fixed to the engine block by means of the fixing rod 67, and the second carrier 65 is installed on the main journal 1 so as not to idle.

When the diameter of the sun gear 51 is 22, the diameter of each of the planetary gear 53 and the auxiliary planetary gear 53*a* is 4.5, the diameter of the ring gear 54 is 33, and the carrier 54 is stopped, the ring gear 54 rotates by 0.667 turn when the sun gear 51 rotates by 1 turn.

The diameter of the second sun gear 61 is 10, the diameter of the second planetary gear 63 is 5, the diameter of the second ring gear 64 is 20, and the second sun gear 61 does not rotate.

The second planetary gear shaft 62 rotates at the same speed as the main journal 1. The second ring gear 64 rotate by 1.5 turns when the second planetary gear shaft 62 rotates by 1 turn.

Therefore, it can be seen that when the main journal 1 and the second planetary gear shaft 62 rotate by 1 turn, the ring gear 54 rotates by 1 turn. That is, the main journal 1 and the ring gear 54 rotate together.

In this case, when the carrier 55 rotates, the effective length of the crank arm 3 is adjusted, such that the compression ratio, the stroke, and the amount of exhaust gas are changed.

In FIGS. 19 and 20, the sun gear 51 is connected to the gear disk 56, the carrier 55 is connected to a connecting ring 57, the external ring gear 54*o* is provided outside the ring gear 54, and the eccentric sleeve control auxiliary gear 21 engages with the external ring gear 54*o*. The advancement and retraction control may be performed by the gear disk 56.

The second sun gear 61 is installed on the main journal 1 so as to idle, the second sun gear 61 is fixed to the engine block by means of the fixing rod 67, the second carrier 65 is connected to the connecting ring 57, the second ring gear 64 is connected to the second gear disk 66, and the second gear disk 66 is installed on the main journal 1 so as not to idle.

When the diameter of the sun gear 51 is 18, the diameter of the planetary gear 53 is 5, the diameter of the ring gear 54 is 28, and the gear disk 56 is stopped, the ring gear 54 rotates by 1.64 turns when the planetary gear shaft 52 rotates by 1 turn.

The diameter of the second sun gear 61 is 10, the diameter of the second planetary gear 63 is 3, the diameter of the second ring gear 64 is 16, and the second sun gear 61 does not rotate.

The second ring gear 64 rotates at the same speed as the main journal 1. The second planetary gear shaft 62 rotates by 0.615 turn when the second ring gear 64 rotates by 1 turn.

Therefore, it can be seen that when the main journal 1 and the second ring gear 64 rotate by 1 turn, the ring gear 54 rotates by 1 turn. That is, the main journal 1 and the ring gear 54 rotate together.

In this case, when the gear disk 56 rotates, the effective length of the crank arm 3 is adjusted, such that the compression ratio, the stroke, and the amount of exhaust gas are changed.

In FIGS. 21 and 22, the eccentric sleeve control auxiliary gear 21 engages with the sun gear 51. The advancement and retraction control may be performed by the carrier 55.

The second sun gear 61 is installed on the main journal 1 so as not to idle, the second carrier 65 is fixed to the engine block by means of the fixing rod 67, the second ring gear 64 is connected to the second gear disk 66, and the second gear disk 66 is connected to the ring gear 54.

When the diameter of the sun gear 51 is 21, the diameter of the planetary gear 53 is 8.2, the diameter of the ring gear 54 is 37.4, and the carrier 55 is stopped, the sun gear 51 rotates by −1.78 turns when the ring gear 54 rotates by 1 turn.

The diameter of the second sun gear 61 is 10, the diameter of the second planetary gear 63 is 4, the diameter of the second ring gear 64 is 18, and the second carrier 65 does not rotate.

The second sun gear 61 rotates at the same speed as the main journal 1. The second ring gear 64 rotates by −0.56 turn when the second sun gear 61 rotates by 1 turn.

Therefore, it can be seen that when the main journal 1 and the second sun gear 61 rotate by 1 turn, the sun gear 51 rotates by 1 turn. That is, the main journal 1 and the ring gear 54 rotate together.

In this case, when the carrier 55 rotates, the effective length of the crank arm 3 is adjusted, such that the compression ratio, the stroke, and the amount of exhaust gas are changed.

In FIGS. 23 and 24, the sun gear 51 is installed on the main journal 1 so as to idle, the carrier 55 is connected to the carrier gear 58, the ring gear 54 is connected to the gear disk 56, and the eccentric sleeve control auxiliary gear 21 engages with the carrier gear 58. The advancement and retraction control may be performed by the gear disk 56.

The second sun gear 61 is connected to the second gear disk 66, the second gear disk 66 is connected to the sun gear 51, the second carrier 65 is installed on the main journal 1 so as not to idle, and the second ring gear 64 is fixed to the engine block by means of the fixing rod 67.

When the diameter of the sun gear 51 is 10, the diameter of the planetary gear 53 is 4, the diameter of the ring gear 54 is 18, and the gear disk 56 is stopped, the carrier gear 58 rotates by 0.357 turn when the sun gear 51 rotates by 1 turn.

The diameter of the second sun gear 61 is 20, the diameter of the second planetary gear 63 is 8, the diameter of the second ring gear 64 is 36, and the second ring gear 64 does not rotate.

The second carrier 65 rotates at the same speed as the main journal 1. The second sun gear 61 rotates by 2.8 turns when the second carrier 65 rotates by 1 turn.

Therefore, it can be seen that when the main journal 1 and the second carrier 65 rotate by 1 turn, the carrier gear 58 also rotates by 1 turn. That is, the main journal 1 and the carrier gear 58 rotate together.

In this case, when the gear disk 56 rotates, the effective length of the crank arm 3 is adjusted, such that the compression ratio, the stroke, and the amount of exhaust gas are changed.

In FIGS. 25 and 26, the sun gear 51 is installed on the main journal 1 so as to idle, the external ring gear 54*o* is provided outside the ring gear 54, and the eccentric sleeve control auxiliary gear 21 engages with the external ring gear 54*o*. The advancement and retraction control may be performed by the carrier 55.

The second sun gear 61 is installed on the main journal 1 so as to idle, the second sun gear 61 is connected to the sun gear 51, the second carrier 65 is fixed to the engine block by means of the fixing rod 67, the second ring gear 64 is connected to the second gear disk 66, and the second gear disk 66 is installed on the main journal 1 so as not to idle.

When the diameter of the sun gear 51 is 10, the diameter of the planetary gear 53 is 4, the diameter of the ring gear 54 is 18, and the carrier 54 is stopped, the ring gear 54 rotates by −0.56 turn when the sun gear 51 rotates by 1 turn.

The diameter of the second sun gear 61 is 10, the diameter of the second planetary gear 63 is 4, the diameter of the second ring gear 64 is 18, and the second carrier 65 does not rotate.

The second ring gear 64 rotates at the same speed as the main journal 1. The second sun gear 61 rotates by −1.8 turns when the second ring gear 64 rotates by 1 turn.

Therefore, it can be seen that when the main journal 1 and the second ring gear 64 rotate by 1 turn, the ring gear 54 rotates by 1 turn. That is, the main journal 1 and the ring gear 54 rotate together.

In this case, when the carrier 55 rotates, the effective length of the crank arm 3 is adjusted, such that the compression ratio, the stroke, and the amount of exhaust gas are changed.

In FIGS. 27 and 28, the sun gear 51 is installed on the main journal 1 so as to idle, an external ring timing pulley 54*p* or an external ring sprocket 54*s* is provided outside the ring gear 54, the external ring timing pulley 54*p* is connected to the eccentric sleeve control auxiliary timing pulley 41 by means of the first timing belt 33, and the external ring sprocket 54*s* is connected to the eccentric sleeve control auxiliary sprocket 46 by means of the first timing chain 38. The advancement and retraction control may be performed by the carrier 55.

The second sun gear 61 is installed on the main journal 1 so as to idle, the second sun gear 61 is connected to the sun gear 51, the second carrier 65 is fixed to the engine block by means of the fixing rod 67, the second ring gear 64 is connected to the second gear disk 66, and the second gear disk 66 is installed on the main journal 1 so as not to idle.

When the diameter of the sun gear 51 is 10, the diameter of the planetary gear 53 is 4, the diameter of the ring gear 54 is 18, and the carrier 54 is stopped, the ring gear 54 rotates by −0.56 turn when the sun gear 51 rotates by 1 turn.

The diameter of the second sun gear 61 is 10, the diameter of the second planetary gear 63 is 4, the diameter of the second ring gear 64 is 18, and the second carrier 65 does not rotate.

The second ring gear 64 rotates at the same speed as the main journal 1. The second sun gear 61 rotates by −1.8 turns when the second ring gear 64 rotates by 1 turn.

Therefore, it can be seen that when the main journal 1 and the second ring gear 64 rotate by 1 turn, the ring gear 54 rotates by 1 turn. That is, the main journal 1 and the ring gear 54 rotate together.

In this case, when the carrier 55 rotates, the effective length of the crank arm 3 is adjusted, such that the compression ratio, the stroke, and the amount of exhaust gas are changed.

FIG. 29 illustrates, at once, a result of changing the eccentric sleeve gear 12 to the eccentric sleeve timing pulley 32, changing the eccentric sleeve auxiliary gear 22 to the eccentric sleeve auxiliary timing pulley 42, and connecting the eccentric sleeve timing pulley 32 and the eccentric sleeve auxiliary timing pulley 42 by the second timing belt 34 and a result of changing the eccentric sleeve gear 12 to the eccentric sleeve sprocket 37, changing the eccentric sleeve auxiliary gear 22 to the eccentric sleeve auxiliary sprocket 47, and connecting the eccentric sleeve sprocket 37 and the eccentric sleeve auxiliary sprocket 47 by the second timing chain 39 in FIGS. 6, 7, 9 to 12, and 17 to 24.

FIG. 29 also illustrates a connection relationship between FIGS. 25 and 26.

FIG. 30 illustrates, at once, a result of changing the eccentric sleeve control auxiliary gear 21 to the eccentric sleeve control auxiliary timing pulley 41 or the eccentric sleeve control auxiliary sprocket 46, connecting the sun timing pulley 51*p* or the sun sprocket 51*s* to the sun gear 51, connecting the sun timing pulley 51*p* and the eccentric sleeve control auxiliary timing pulley 41 by the first timing belt 33, a result of connecting the sun sprocket 51*s* and the eccentric sleeve control auxiliary sprocket 46 by the first timing chain 38, a result of installing the external ring timing pulley 54*p* or the external ring sprocket 54*s* outside the ring gear 54, connecting the external ring timing pulley 54*p* and the eccentric sleeve control auxiliary timing pulley 41 by the first timing belt 33, and connecting the external ring sprocket 54*s* and the eccentric sleeve control auxiliary sprocket 46 by the first timing chain 38, a result of changing the carrier gear 58 to the carrier timing pulley 58*p* or the carrier sprocket 58*s* and connecting the carrier timing pulley 58*p* and the eccentric sleeve control auxiliary timing pulley 41 by the first timing belt 33, a result of connecting the carrier sprocket 58*s* and the eccentric sleeve control auxiliary sprocket 46 by the first timing chain 38 in FIGS. 6, 7, and 9 to 24.

FIG. 30 also illustrates a connection relationship between FIGS. 27 and 28.

FIG. 31 illustrates, at once, the result of changing the eccentric sleeve gear 12 to the eccentric sleeve timing pulley 32, changing the eccentric sleeve auxiliary gear 22 to the eccentric sleeve auxiliary timing pulley 42, and connecting the eccentric sleeve timing pulley 32 and the eccentric sleeve auxiliary timing pulley 42 by the second timing belt 34 and the result of changing the eccentric sleeve gear 12 to the eccentric sleeve sprocket 37, changing the eccentric sleeve auxiliary gear 22 to the eccentric sleeve auxiliary sprocket 47, and connecting the eccentric sleeve sprocket 37 and the eccentric sleeve auxiliary sprocket 47 by the second timing chain 39 in FIGS. 6, 7, and 9 to 24 in addition to the change and the result thereof illustrated in FIG. 30. In the state in FIG. 30, FIG. 31 illustrates that the main journal 1, the sun timing pulley 51*p*, the sun sprocket 51*s*, the external ring timing pulley 54*p*, the external ring sprocket 54*s*, the carrier timing pulley 58*p*, and the carrier sprocket 58*s* are rotated by half a turn, and the posture of the eccentric sleeve 13 is changed.

In FIGS. 6, 7, and 9 to 28, the gears, the timing pulleys, or the sprockets may be freely used at the two opposite ends of the eccentric sleeve auxiliary shaft 25 and connected by using the gears, the timing belts, and the timing chains.

The formulas used to calculate the rotation of the planetary gear system are as follows.

$$s = (c - r) \times R/S + c$$

$$r = c - (s - c) \times S/R$$

$$c = (cS + rR)/(S + R)$$

-continued $s$ = rpm of sun gear $r$ = rpm of ring gear $c$ = rpm of carrier $S$ = diameter of sun gear $R$ = diameter of ring gear A process of calculating the rotation in the examples in FIGS. 6 and 7 will be described below.

When the diameter S of the sun gear 51=10, the diameter R of the ring gear 54=18, and the ring gear 54 is stopped, r=0, c=1, and s=(1−0)×18/10+1=2.8.

When the diameter S of the second sun gear 61=10, the diameter R of the second ring gear 64=18, and the second ring gear 64 is stopped, r=0, s=1, and c=(1×10+0×18)/(10+18)=1/2.8.

FIGS. 32 and 33 illustrate the examples of the connecting rods 71 and 81. There are the small ends 72 and 82 and the big ends 73 and 83. The cross-sections of the crankpin 2 and the eccentric sleeve 13 are shown in the large holes of the big ends 73 and 83. It can be seen that when the posture of the eccentric sleeve 13 is changed in the state in which the position of the crankpin 2 is fixed, the positions of the big ends 73 and 83 are changed, and the distances from the center of the crankpin 2 to the small ends 72 and 82 are changed. Even though the crank arm 3 and the main journal 1 are not illustrated, distances and angles at which centers of the big ends 73 and 83 spaced apart from the center of the main journal 1 are changed.

In addition to the apparatus illustrated in FIGS. 1 to 5, FIGS. 34 and 35 illustrate that a rotor 15 is installed on the main journal 1 so as not to idle, a stator 16 is installed on the eccentric sleeve control shaft 10 so as not to idle, one end of a spring 17 is installed on the stator 16 by a fixing device 68 so as not to idle, and the other end of the spring 17 is fixed to the engine block by means of a fixing rod 67. FIG. 34 illustrates a cross-section taken at a position of a cutting line 19 in FIG. 35.

The rotor 15 and the stator 16 may be configured like a generator by using components of the generator, such as a permanent magnet, an electromagnet, a coil, and a conductor. There are several types of generators, including synchronous generators, induction generators, direct current generators, and alternating current generators, each with different characteristics, advantages, and disadvantages, and the configuration method is not limited to any one type of generator. In case that the rotor 15 and the stator 16 are provided, a force is generated by electromagnetic induction when the rotor 15 rotates, such that the stator 16 tends to rotate together with the rotor 15. In the case of the stator 16 stopped at an initial position when there is no current generated in the coil, a larger force is applied to the stator 16 as the amount of current generated by the coil increases, and as a result, the stator 16 may rotate at a larger angle. The current flowing along the coil is determined depending on various factors such as a configuration of the coil, strength of the permanent magnet, a rotational speed of the rotor 15, and electric resistance between coil terminals.

Therefore, with the use of this mean, the eccentric sleeve control shaft 10 may be rotated at a predetermined angle in accordance with a rotational speed of the main journal 1, and the eccentric sleeve control shaft 10 may be controlled.

In addition, as necessary, a force applied to the stator 16 may be adjusted by supplying electricity to the coil from the outside. In general, a high compression ratio is required at a low rotational speed. However, a high compression ratio is not sometimes required at a low rotational speed, like a process of starting the engine.

The spring 17 returns the stator 16 to the initial position when the rotor 15 is not rotated. When the rotor 15 rotates, the stator 16 is rotated at a predetermined angle in accordance with the intensity of a force applied by the rotor 15. The shape of the spring 17, the place of installation, and the method of installation are not limited as illustrated in the drawings. The positions of the rotor 15 and the stator 16 may be interchanged. The stator 16 may be installed on the main journal 1 so as not to idle, the rotor 15 may be installed on the eccentric sleeve control shaft 10 so as not to idle.

In FIGS. 36 to 38, the sun gear 51 of the first planetary gear system is installed on the main journal 1 so as not to idle, the external ring gear 54*o* is provided outside the ring gear 54, the planetary gear shaft 52 is connected to the carrier 55, a part of the planetary gear 53 engages with the rack of the rack rod 75, and the eccentric sleeve control auxiliary gear 21 engages with the external the ring gear 54*o*.

The eccentric sleeve auxiliary gear 22 and the eccentric sleeve control auxiliary gear 21 are respectively installed at two opposite ends of the eccentric sleeve auxiliary shaft 25 so as not to idle, the eccentric sleeve auxiliary shaft 25 is installed on the eccentric sleeve auxiliary shaft support bracket 5 so as to idle, the eccentric sleeve 13 is connected to the eccentric sleeve gear 12 and installed on the crankpin 2 so as to idle, and the eccentric sleeve gear 12 engages with the eccentric sleeve auxiliary gear 22.

The eccentric sleeve control auxiliary gear 21 may rotate the eccentric sleeve 13 by means of the eccentric sleeve auxiliary shaft 25, the eccentric sleeve auxiliary gear 22, and the eccentric sleeve gear 12, and the advancement and retraction control of the eccentric sleeve 13 may be performed by the motion of the rack rod 75.

A weight 76 is connected to the rack rod 75 including the rack, the rack rod 75 is installed on a non-illustrated rack rod support device, and the rack of the rack rod 75 and the planetary gear 53 engage with each other. The rack rod support device is fixed to the carrier 55, and the rack rod support device and the rack rod 75 rotate together with the carrier 55. A non-illustrated spring is installed between the rack rod 75 and the rack rod support device, and the rack rod 75 returns to the initial position when the carrier 55 is not rotated. When the carrier 55 rotates, the planetary gear 53 rotates at a predetermined angle in accordance with a distance by which the rack rod 75 is moved by a centrifugal force.

When the diameter of the sun gear 51 is 10, the diameter of the planetary gear 53 is 4, the diameter of the ring gear 54 is 18, and the carrier 55 is stopped, the ring gear 54 rotates by −0.56 turn when the sun gear 51 rotates by 1 turn. When the carrier 55 rotates together with the sun gear 51, the planetary gear 53 does not rotate, and the ring gear 54 rotates together with the sun gear 51.

When the planetary gear 53 does not rotate, the carrier 55 and the ring gear 54 rotate at the same speed as the sun gear 51. That is, the main journal 1 and the ring gear 54 rotate together.

In this case, when the rack rod 75 is rotated by the centrifugal force and rotates the planetary gear 53, the ring gear 54 is advanced or retracted relative to the sun gear 51 to rotate the eccentric sleeve control auxiliary gear 21 and rotate the eccentric sleeve auxiliary shaft 25, the eccentric sleeve auxiliary gear 22, the eccentric sleeve gear 12, and the eccentric sleeve 13, such that the effective length of the crank arm 3 is changed, and the compression ratio, the stroke, and the amount of exhaust gas are changed.

INDUSTRIAL APPLICABILITY

There is no difficulty in using the variable compression ratio engine according to the present invention for the internal combustion engine because of the simple structure of variable compression ratio engine. The change in compression ratio may be implemented differently for each cylinder and occur immediately. Therefore, the internal combustion engine is suitable for the vehicle that needs to be used in the environment that changes over time.

The invention claimed is:

1. A variable compression ratio engine comprising:

a crankshaft having an eccentric sleeve auxiliary shaft support bracket installed on a crank arm;

an eccentric sleeve control gear connected to an eccentric sleeve control shaft installed on a main journal of the crankshaft;

an eccentric sleeve gear connected to an eccentric sleeve installed on a crankpin of the crankshaft; and an eccentric sleeve auxiliary shaft having one end at which an eccentric sleeve control auxiliary gear is installed, and the other end at which an eccentric sleeve auxiliary gear is installed, wherein the eccentric sleeve auxiliary shaft is installed on the eccentric sleeve auxiliary shaft support bracket, and wherein the eccentric sleeve control gear engages with the eccentric sleeve control auxiliary gear, and the eccentric sleeve gear engages with the eccentric sleeve auxiliary gear.

2. The variable compression ratio engine of claim 1, wherein any one of a process of changing the eccentric sleeve control gear to an eccentric sleeve control timing pulley, changing the eccentric sleeve control auxiliary gear to an eccentric sleeve control auxiliary timing pulley, and connecting the eccentric sleeve control timing pulley and the eccentric sleeve control auxiliary timing pulley by a first timing belt and a process of changing the eccentric sleeve control gear to an eccentric sleeve control sprocket, changing the eccentric sleeve control auxiliary gear to an eccentric sleeve control auxiliary sprocket, and connecting the eccentric sleeve control sprocket and the eccentric sleeve control auxiliary sprocket by a first timing chain is performed, and wherein any one of a process of changing the eccentric sleeve gear to an eccentric sleeve timing pulley, changing the eccentric sleeve auxiliary gear to an eccentric sleeve auxiliary timing pulley, and connecting the eccentric sleeve timing pulley and the eccentric sleeve auxiliary timing pulley by a second timing belt and a process of changing the eccentric sleeve gear to an eccentric sleeve sprocket, changing the eccentric sleeve auxiliary gear to an eccentric sleeve auxiliary sprocket, and connecting the eccentric sleeve sprocket and the eccentric sleeve auxiliary sprocket by a second timing chain is performed.

3. The variable compression ratio engine of claim 2, wherein a rotor is installed on one of the main journal and the eccentric sleeve control shaft, and a stator is installed on the other.

4. The variable compression ratio engine of claim 1, wherein a rotor is installed on one of the main journal and the eccentric sleeve control shaft, and a stator is installed on the other.

5. A variable compression ratio engine comprising:

a crankshaft having an eccentric sleeve auxiliary shaft support bracket installed on a crank arm;

a planetary gear system comprising a sun gear, a planetary gear shaft, a planetary gear, and a ring gear installed on a main journal of the crankshaft;

an eccentric sleeve gear connected to an eccentric sleeve installed on a crankpin of the crankshaft; and an eccentric sleeve auxiliary shaft having one end at which an eccentric sleeve control auxiliary gear is installed, and the other end at which an eccentric sleeve auxiliary gear is installed, wherein the eccentric sleeve auxiliary shaft is installed on the eccentric sleeve auxiliary shaft support bracket, and wherein any one of the sun gear, the ring gear, an external ring gear provided outside the ring gear, and a carrier gear connected to the planetary gear shaft engages with the eccentric sleeve control auxiliary gear, and the eccentric sleeve gear and the eccentric sleeve auxiliary gear engage with each other.

6. The variable compression ratio engine of claim 5, wherein the eccentric sleeve gear changes to an eccentric sleeve timing pulley, the eccentric sleeve auxiliary gear changes to an eccentric sleeve auxiliary timing pulley, and the eccentric sleeve timing pulley and the eccentric sleeve auxiliary timing pulley are connected by a second timing belt.

7. The variable compression ratio engine of claim 6, wherein the eccentric sleeve control auxiliary gear changes to an eccentric sleeve control auxiliary timing pulley, and any one of a sun timing pulley installed on a part of the sun gear, an external ring timing pulley provided outside the ring gear, and a carrier timing pulley with the changed the carrier gear is connected to the eccentric sleeve control auxiliary timing pulley by a first timing belt.

8. The variable compression ratio engine of claim 7, wherein a rack of a rack rod engages with a part of the planetary gear.

9. The variable compression ratio engine of claim 6, wherein the eccentric sleeve control auxiliary gear changes to an eccentric sleeve control auxiliary sprocket, and any one of a sun sprocket installed on a part of the sun gear, an external ring sprocket provided outside the ring gear, and a carrier sprocket with the changed carrier gear is connected to the eccentric sleeve control auxiliary sprocket by a first timing chain.

10. The variable compression ratio engine of claim 6, wherein a rack of a rack rod engages with a part of the planetary gear.

11. The variable compression ratio engine of claim 5, wherein the eccentric sleeve gear changes to an eccentric sleeve sprocket, the eccentric sleeve auxiliary gear changes to an eccentric sleeve auxiliary sprocket, and the eccentric sleeve sprocket and the eccentric sleeve auxiliary sprocket are connected by a second timing chain.

12. The variable compression ratio engine of claim 11, wherein the eccentric sleeve control auxiliary gear changes to an eccentric sleeve control auxiliary timing pulley, and any one of a sun timing pulley installed on a part of the sun gear, an external ring timing pulley provided outside the ring gear, and a carrier timing pulley with the changed the carrier gear is connected to the eccentric sleeve control auxiliary timing pulley by a first timing belt.

13. The variable compression ratio engine of claim 11, wherein the eccentric sleeve control auxiliary gear changes to an eccentric sleeve control auxiliary sprocket, and any one of a sun sprocket installed on a part of the sun gear, an external ring sprocket provided outside the ring gear, and a carrier sprocket with the changed carrier gear is connected to the eccentric sleeve control auxiliary sprocket by a first timing chain.

14. The variable compression ratio engine of claim 11, wherein a rack of a rack rod engages with a part of the planetary gear.

15. The variable compression ratio engine of claim 5, wherein the eccentric sleeve control auxiliary gear changes to an eccentric sleeve control auxiliary timing pulley, and any one of a sun timing pulley installed on a part of the sun gear, an external ring timing pulley provided outside the ring gear, and a carrier timing pulley with the changed the carrier gear is connected to the eccentric sleeve control auxiliary timing pulley by a first timing belt.

16. The variable compression ratio engine of claim 15, wherein a rack of a rack rod engages with a part of the planetary gear.

17. The variable compression ratio engine of claim 5, wherein the eccentric sleeve control auxiliary gear changes to an eccentric sleeve control auxiliary sprocket, and any one of a sun sprocket installed on a part of the sun gear, an external ring sprocket provided outside the ring gear, and a carrier sprocket with the changed carrier gear is connected to the eccentric sleeve control auxiliary sprocket by a first timing chain.

18. The variable compression ratio engine of claim 5, wherein a rack of a rack rod engages with a part of the planetary gear.

* * * * *